(12) United States Patent
Bindouski et al.

(10) Patent No.: US 12,003,672 B1
(45) Date of Patent: Jun. 4, 2024

(54) METHODS OF DUPLEX TRANSFER OF VOICE STREAMS BETWEEN MOBILE SUBSCRIBERS AND CLIENTS OF IM/VOIP WITH THE CORRESPONDING IMPLEMENTATION OF PBX AND OF THE VOIP-CELL GATEWAY BASED ON SMARTPHONES

(71) Applicant: 3HAND LLC, Wilmington, DE (US)

(72) Inventors: Uladzimir Bindouski, Minsk (BY); Siarhei Kuchun, Minsk (BY)

(73) Assignee: 3HAND LLC, Wilmington, DE (US)

( * ) Notice: Subject to any disclaimer, the term of this patent is extended or adjusted under 35 U.S.C. 154(b) by 0 days.

(21) Appl. No.: 18/501,491

(22) Filed: Nov. 3, 2023

Related U.S. Application Data

(60) Provisional application No. 63/431,045, filed on Dec. 8, 2022.

(51) Int. Cl.
*H04M 7/00* (2006.01)

(52) U.S. Cl.
CPC ....... *H04M 7/0066* (2013.01); *H04M 7/0006* (2013.01); *H04M 7/0081* (2013.01); *H04Q 2213/1322* (2013.01)

(58) Field of Classification Search
CPC .............. H04M 7/0066; H04M 7/0081
See application file for complete search history.

(56) References Cited

U.S. PATENT DOCUMENTS

| | | | | |
|---|---|---|---|---|
| 2005/0286549 A1* | 12/2005 | Murphy | .............. | H04M 1/2535 370/352 |
| 2006/0203977 A1* | 9/2006 | Erhart | .............. | H04M 3/493 379/88.13 |
| 2012/0195304 A1* | 8/2012 | Fogel | .............. | H04L 65/1053 370/352 |

* cited by examiner

*Primary Examiner* — Hashim S Bhatti

(57) ABSTRACT

Duplex transmission of voice streams between mobile phone call applications and IM/VoIP service clients installed on smartphones is carried out by connecting audio outputs to audio inputs of smartphone audio interfaces. These voice communication applications can be installed on the same smartphone, on two different smartphones, or on one smartphone and one computer of any type. The inventive method contains connections both between the same type and between different wired and wireless audio interfaces of smartphones. As a consequence of the application of the technical result of the method for duplex transmission of voice streams, an invention is claimed for methods for implementing PBX with various types of routing, and a VoIP-Cell gateway for broadcasting voice traffic between a mobile phone client and a VoIP client running IP-PBX.

24 Claims, 9 Drawing Sheets

METHODS OF DUPLEX TRANSFER OF VOICE STREAMS BETWEEN MOBILE SUBSCRIBERS AND CLIENTS OF IM/VOIP WITH THE CORRESPONDING IMPLEMENTATION OF PBX AND OF THE VOIP-CELL GATEWAY BASED ON SMARTPHONES

CROSS-REFERENCE TO RELATED APPLICATIONS

This application claims the benefit of U.S. Provisional Application No. 63/431,045, filed Dec. 8, 2022, which is incorporated herein by reference in its entirety.

TECHNICAL FIELD OF THE INVENTION

The invention in general belongs to the field of telecommunication, in particular, to methods of transmission of duplex voice streams between IM/VoIP clients and mobile subscribers and to corresponding methods of implementation of a PBX and VoIP-Cell gateway based on smartphones.

BACKGROUND OF THE INVENTION

The main instrument of activity of the modern person is the smartphone—the gadget with many options of use and a possibility of installation of millions of available applications. One of the most widespread options of use of the smartphone is the function of social interaction by means of communication applications for receiving and making phone calls and also client applications of IM/VoIP services for text and voice communication.

Though phone call applications and IM/VoIP service clients can be installed on the same smartphone or two different smartphones, and have similar functionality, program switching and transfer of voice streams between these applications while only using the resources of one or several smartphones without use of remote services is impossible due to the standards of safety of the operating system of the smartphone (e.g., Android or IOS). That is, despite the fact that each smartphone has redundant hardware and program resources for processing and transfer of audio of streams between voice communication applications of the smartphone and phone applications of the smartphone without the involvement of external services, according to the security policy accepted by developers of popular operating systems of smartphones, the actions described above are prohibited and impossible.

Thus, implementation of additional functions associated with convergence of different smartphone voice communication applications by only installing the corresponding mobile application is also impossible for the same reasons.

The policy of audio safety of an operating system of a smartphone (for example, Android or IOS) prohibits the applications installed by users (for example, applications of IM/VoIP services) from capturing the audio stream of telephone calls for subsequent voluntary routing and modification. Voice traffic telephone and IM/VoIP calls according to audio of the policy of the smartphone operating system is routed by default only on one audio output with a connected load and with a certain priority—to an internal speaker and loudspeaker, or a wired headset, or a Bluetooth headset, or a USB headset without a possibility of modification and routing to IP (including Bluetooth) or telephone networks.

Direct connection via Bluetooth wireless protocol of two smartphones for direct exchange of voice traffic is also impossible because of the absence in the operating system kernel of the necessary drivers of the corresponding Bluetooth profiles on standards of safety.

Taking into account the safety requirements of the audio policy, there are patented methods and systems for transmission of sound streams between clients of IM/VoIP services and subscribers of cellular networks on the basis of translation systems of text messages into voice and back. That is, actually, users exchange text messages transformed from voice which as a result are listened to by both users in real time. Some of them are listed below.

System and method for communicating with instant messaging clients using a telephone—U.S. Pat. No. 7,512,217B2.

Voice and text communication system—US20100150333A1.

Such solutions are not widely used due to technological delays and errors in translating voice into text and back. The user prefers live voice to communicate in real time.

There are also patented methods and systems for transmitting audio streams between two or more telecommunications devices using wireless headsets specially designed for these cases. Such a headset connects wirelessly simultaneously to two or more telephones after the telephones enter a conversational state and can broadcast audio streams between these telephones without the possibility of automatic switching based on routing.

Some of them are listed below.

Wireless headset and a headset system for transferring call between two telecommunication devices—U.S. Pat. No. 9,686,662B2.

In-headset conference calling—U.S. Pat. No. 8,121,547B2.

Teleconferencing with multiple headsets coupled to a single mobile telephone—US20150072666A1.

The methods described in the patents mentioned above can be used to implement conference calls or reserve a conversational channel between remote subscribers of a telephone network with automatic switching to a backup channel in the event of a failure of the main channel. Headsets with the properties mentioned above are not mass-produced, but in practice other devices with similar properties are used—corporate speakerphones.

A corporate speakerphone is an intercom equipped with a microphone and audio speaker for corporate conferences, which is designed to combine multiple audio sources from landlines, smartphones, computers and microphones using external interfaces including AUX, USB or Bluetooth.

Initialization of communication between participants for each new conference occurs by manually connecting an audio source from each conference participant and then combining the required number of audio streams from various types of sources on the speakerphone for processing and playback with the best quality without the possibility of automatic switching based on routing.

Considering the above objective security problems of "internal" safety of smartphones, the tasks of convergence of mobile telephone and IM/VoIP of voice services are solved by means of "external" resources and services.

It should be noted that there is a considerable number of patents which describe methods and systems of convergence of cellular and IM/VoIP voice services using remote servers and gateways. Some of them are listed below.

Systems and methods for initiating communications between IM clients and mobile clients—U.S. Pat. No. 9,088,877B1. In practice, this is not used, as it requires additional complex non-standard interaction between the mobile phone and the IM/VoIP client through additional servers. That is, the method has not become widespread due to its complexity and the possible use of additional numbering for IM/VoIP clients.

Methods for receiving telephone calls using instant messages—EP1393539B1 and a network system for redirecting telephone calls from telephone networks to VoIP clients for roamers and subscribers who do not answer—U.S. Pat. No. 8,478,277B2. In practice, these solutions are also not used, since they require technological interaction between IM/VoIP operators and telecom services that are not interested in cooperation, since IM/VoIP services are direct competitors of telecom operators in the market for providing text and voice communication services.

To converge telephone and IM/VoIP voice services, IM/VoIP service operators are forced to build or rent their own "telephone" infrastructure in each country to "land" voice calls to/from telephone networks at telephone operator prices. Thus, clients of IM/VoIP services are forced to pay for voice calls to telephone networks, taking into account the costs and profits of IM/VoIP operators.

For example, an IM Viber client running the external Viber Out service has the ability to make outgoing calls to phone numbers for an additional fee. For incoming calls, a dedicated local telephone number is used with forwarding to the IM Viber client, also for an additional fee.

The IM Skype for Business client has the ability to make outgoing and receive incoming phone calls running Skype Server for Business or a third-party IP-PBX for an additional fee.

Thus, direct interaction between mobile telephone and IM/VoIP networks without the use of remote services for exchanging voice traffic does not exist in practice for security reasons.

Accordingly, in the current situation, a simple user cannot make a direct voice call directly from the IM/VoIP client application to a remote mobile network subscriber, just as a mobile network subscriber cannot directly call a remote IM/VoIP service client without using paid remote services.

Let's look at some user-useful scenarios for using carrier-independent and freely user-configurable smartphone functionality to initiate communications and transmit voice streams between the IM/VoIP service smartphone client application and the telephone application.

The user has one or two basic smartphones on the cellular carrier's home network that are specifically configured to initiate communications and transmit voice streams between the IM/VoIP service smartphone client application and the telephone application. As a result, incoming calls from the "home" mobile network will be automatically routed through the IM/VoIP service client installed on the "home" basic smartphone to the IM/VoIP client application of the smartphone that the user has with him while in the roaming region. In addition, the user can make calls to the home mobile network from a roaming area using the IM/VoIP service client to communicate with the "home" IM/VoIP service client installed on the base smartphone, which automatically routes the call to the home mobile network subscriber.

Another use case involves implementing a cheap and easy-to-install and operate PBX (PBX) for small businesses without using a third-party VoIP server. Incoming calls arrive from the mobile network to the underlying smartphone (or smartphones), which are specifically configured to initiate communication and transfer voice streams between the IM/VoIP service's smartphone client application and the phone application, then enabling the IVR system. The mobile caller, based on IVR suggestions, selects the called remote IM/VoIP client. Next, this call is routed through the IM/VoIP client installed on the base smartphone to the remote IM/VoIP client, which is one of the PBX subscribers. In addition, any PBX subscriber, who is also a remote client of the IM/VoIP service, can make a call to any subscriber of the telephone network through the IM/VoIP client application of the base smartphone (or smartphones) by transferring the phone number of the called subscriber from the remote IM/VoIP client service application to the IM/VoIP client of a basic smartphone.

The following scenario contains an implementation of a VoIP-Cell gateway based on a smartphone (or smartphones) that are specifically configured to initiate communications and transmit voice streams between a smartphone IM/VOIP client application and a smartphone mobile phone client application, and which can be used as part of any other IP-PBX.

In fact, basic smartphones are an easy-to-install and operate low-cost user gateway between IP and cellular networks that can be easily and quickly configured by any incompetent user using the user interface of the corresponding mobile application for any task of convergence of telephone and other communication voice services.

Considering that more than one billion smartphones are decommissioned every year in the world, the secondary use of smartphones based on the claimed inventions will make it possible to create products that are cheap and useful for the user. The application of this invention will likely not be limited to the scenarios described above, as developers and users will be presented with a new ecosystem with new capabilities and use cases. Therefore, there is a need for methods to transfer voice streams between smartphone telephone applications and other smartphone voice communication applications using the hardware and software resources of the smartphone without the involvement of external services.

SUMMARY OF THE INVENTION

The technical problem to which the claimed invention is aimed can be formulated as the development of a method for duplex transmission of voice streams between mobile applications, mobile phone clients, and mobile applications, IM/VOIP clients, using only the hardware and software resources of a smartphone without involving external services, taking into account that that the smartphone uses only one common audio input and one common audio output simultaneously for both the mobile phone client application and the smartphone IM/VOIP client application. That is, at one time there can be only one smartphone user, and, accordingly, only one active audio interface for several sound sources and receivers in the same smartphone.

The technical result is achieved by using, in several aspects and variants, a method for duplex transmission of voice streams between an IM/VOIP client mobile application and a mobile phone client application using a connection of audio outputs to audio inputs of a smartphone audio interface of a smartphone audio interface (or smartphones) and automatic control of mobile phone clients and IM/VOIP clients using smartphone software without direct tactile communication with the user.

This software is designed to control a smartphone voice communication application in accordance with logic to determine the circumstances under which it is necessary to make a call, answer a call or end a call and is implemented as a software agent as a separate application for a smartphone, or as part of the operating system functionality smartphone systems, or as an API for use in the development of client applications for IM/VOIP services, or as part of the functionality of an IM/VOIP client mobile application.

Thus, the aspects and options for coordinated pre-connections of audio output and audio input of the audio interface of a smartphone (or smartphones) claimed in this invention along with the corresponding management of IM/VOIP and mobile phone clients provides the technical result of duplex voice transmission between mobile application clients IM/VOIP and mobile phone applications.

Below, a description of the invention necessary for understanding its essence will be presented in the order of content of the claims.

In one aspect, the claimed invention includes a method that includes duplex transmission of voice streams over an electrically matched wire connection between the audio outputs of one smartphone and the audio inputs of another smartphone of smartphone audio interfaces. In one embodiment of this aspect, transmission occurs over a hard-wired analog audio output connection to the audio inputs of the analog wired audio interfaces of smartphones (FIG. 1). In another embodiment, the transmission is carried out via a hard-wired digital connection of the audio outputs with the audio inputs of the digital wired audio interfaces of smartphones. The practical implementation of this option is possible both with reconciliation (FIG. 2) and without the use of "external" sound cards by directly connecting the audio outputs to the audio inputs of digital wired audio interfaces of smartphones (FIG. 1). That is, the audio output of one smartphone for connecting a speaker is connected through electronic matching components to the audio input for connecting a microphone of another smartphone and vice versa.

Another embodiment of this aspect comprises duplexing the wired analog audio outputs and audio inputs of one smartphone with the analog audio inputs and audio outputs of a sound card connected to the digital wired audio interface of another smartphone. This option involves connecting a sound card with analog audio inputs and outputs to the digital audio interface of one of the smartphones, which in turn are connected through electrical matching components to the analog audio inputs and outputs of another smartphone. The sound card is connected to the USB or USB-C interface of the smartphone (FIG. 3).

In this way, the audio outputs are connected to the audio inputs of smartphone audio interfaces between the IM/VoIP service client application running on one smartphone and the mobile phone client application running on another smartphone for mutual duplex audio transmission between applications. Accordingly, this embodiment contains a cross-connection between the audio input of one smartphone and the audio output of another smartphone and vice versa through matching electronic components. Analog interfaces of smartphones are AUX and USB-C connectors of the smartphone, and digital interfaces are USB or USB-C connectors.

In another aspect, the claimed invention includes a method that includes interaction between a mobile phone client or a mobile IM/VOIP client and a corresponding software agent installed on a smartphone that, in accordance with logic to determine circumstances, controls functions similar to user commands of mobile clients telephone and IM/VOIP to make a call, answer a call or end a call automatically without direct tactile communication with the user.

That is, the software agent, in accordance with the events of changes in the state of the conversational connection between the telephone network subscriber and the IM/VOIP client, sends the corresponding commands (making a call, answering a call or ending a call) to the mobile applications of the phone and IM/VOIP for execution. For example, in the case of an incoming call to a telephone or IM/VOIP voice communication client, the software agent sends a command to answer the call, etc.

One embodiment of this aspect further comprises the corresponding software agent using accessibility options of smartphone operating systems to control the mobile phone client and the mobile IM/VOIP client through a graphical interface of the smartphone.

That is, this software agent uses special capabilities of smartphone operating systems to access directly the user interface. Thus, the necessary commands (making a call, answering a call or ending a call) are transmitted through the user interface of the smartphone by changing the state ("soft" pressing) of the corresponding on-screen button.

In a further aspect, the claimed invention includes a method that includes duplex transmission of voice streams followed by connecting audio outputs to audio inputs on a switching device with the ability to connect simultaneously to more than one smartphone.

A switching device in the context of the claimed invention is a device that is designed for switching and subsequent duplex transmission of voice streams between communication voice clients that are installed on smartphones or other computers of any type, using audio interfaces, including AUX, USB or Bluetooth. That is, the audio interfaces of smartphones and other computers of any type are previously connected to the same type of switching device interfaces, which, under the control of the software of smartphones or computers, switches duplex voice streams between the corresponding communication voice clients of various smartphones or other computers of any type without direct tactile participation of users.

That is, the corresponding variants of this aspect contain the exchange of voice streams between communication voice clients installed on smartphones or other computers of any type, which occurs through a switching device that provides simultaneous connection of several computers of any type both via wireless Bluetooth interfaces and wired digital and analog interfaces.

Another variant of this aspect involves switching audio streams between different and similar interfaces of the switching device, connected to various smartphones or other computers of any type, and simultaneously arriving at the switching device via wired analog, digital and Bluetooth interfaces. Accordingly, the switching of audio streams does not depend on the type of connected audio interface or computer. That is, any audio streams arriving at the switching device both from interfaces of the same type and from interfaces of different types can be switched with each other.

And another variant of this aspect includes duplex transmission of voice streams with subsequent connection of audio outputs to audio inputs on a switching device with the ability to automatically control mobile phone client applications and IM/VOIP client applications using software of a smartphone or computer of any type. This option for duplex transmission of voice streams between computers of any type with subsequent connection of audio outputs to audio inputs on a switching device is fundamentally different from the options for using speakerphones using automatic switching and routing of audio streams coming from various smartphones and computers using the software of these smartphones or other computers of any type. type.

Thus, in general, all embodiments of the aspect include the implementation of duplex transmission of voice streams with subsequent automatic connection of audio outputs to audio inputs on the switching device using software of smartphones or other computers of any type. An exemplary implementation is illustrated in FIG. 4. In fact, a switching device equipped with different types of interfaces, its form factor resembles a corporate speakerphone without local microphones and speakers with the ability to automatically switch audio streams from various communication applications using smartphone software without direct tactile communication with the user, installed on smartphones and other computers of any type connected to different interfaces of the switching device. Accordingly, voice streams for conversational connections between various communication voice applications from different operators installed on various smartphones or other computers of any type can be switched directly without the participation of external services controlled by the corresponding software of smartphones or other computers of any type.

In another aspect, the claimed invention includes a method that includes duplex transmission of voice streams over an electrically matched wired connection using an audio output to audio input connection of a smartphone audio interface between mobile phone client applications and IM/VOIP client applications installed on the same and the same smartphone with channel sharing of voice streams between mobile phone clients and IM/VOIP clients for duplex transmission of audio streams between mobile phone clients and IM/VOIP clients (FIG. 5). In this aspect, since mobile phone clients and IM/VOIP clients are installed on the same smartphone and broadcast to the same common audio output and receive an audio stream from the same common audio input, the audio input and audio output of the smartphone physically connected over an electrically matched wire connection through a modulation and demodulation device to separate voice streams from different communications voice clients and eliminate mutual interference.

Accordingly, part of the voice stream separation functionality implemented by smartphone software includes modulation of the voice stream emanating from the IM/VoIP client application with an ultrasonic carrier frequency, and transmission of the modulated audio stream to the audio output of the smartphone, demodulation of the incoming audio stream with audio input of a smartphone with subsequent transmission of the resulting voice stream to a remote client of the IM/VoIP service. Separation of voice streams using smartphone software can be implemented in the form of additional software as a separate smartphone application, or as part of the functionality of the smartphone operating system, or as an API for use in the development of client applications for IM/VOIP services, or as part of the functionality of an client application IM/VOIP smartphone.

Thus, the functionality of the aspect described above transmits the modulated outgoing voice stream to the audio output of the smartphone, and the incoming voice stream from the audio input of the smartphone is demodulated and transmitted to the remote client of the IM/VoIP service. Accordingly, part of the functionality for separating voice streams of this aspect, implemented on a modulation and demodulation device connecting the audio output to the audio input of the smartphone audio interface, includes:

detection and demodulation of a voice stream modulated by an ultrasonic carrier frequency coming from the audio output of a smartphone, detection and modulation of an unmodulated real voice stream with an ultrasonic carrier frequency coming from the audio output of a smartphone, addition of a voice stream modulated by an ultrasonic carrier frequency and a demodulated audio stream with subsequent transmission of the resulting voice stream to the audio input of the smartphone.

Accordingly, the voice stream separation portion of the functionality of this aspect, implemented on a modulation and demodulation device attached to the audio output and audio input, separates the incoming modulated and normal real voice streams, converts or demodulates the modulated voice stream into a normal real voice stream, and the incoming the normal real voice stream is modulated by an ultrasonic carrier frequency. Then both converted streams are added and sent to the output of the device. Accordingly, the device connects the audio output to the audio input of the smartphone's audio interface and changes the characteristics of the two audio streams without changing their information content (FIG. 5).

A modulation and demodulation device with the functionality described above can be implemented on the basis of a cheap DSP processor, any smartphone or a simple single-board computer. As an option, a modulation and demodulation device with the characteristics listed above can be implemented in the form of a wired headset. In this case, the user receives a familiar and necessary device with a useful additional function.

This aspect cannot be applied to a wireless connection, since modulation and demodulation of voice streams by ultrasound is not possible due to the use of low bitrate (64 kBit/s) in Bluetooth profiles for telephone calls and the use of a narrow frequency range of the audio stream (up to 4 kHz) for a normal telephone conversation, which is not sufficient for the use of ultrasonic modulation. In addition, the use of Bluetooth profiles adapted for playing music with a wide frequency range is not possible in this case, since the smartphone client application can only work with Bluetooth phone profiles.

In yet another aspect, the claimed invention includes a method that further comprises duplex transmission of voice streams between smartphone mobile phone client applications and any type of computer IM/VOIP application clients using a smartphone audio interface and any type of computer audio interface (FIG. 1-FIG. 7, FIG. 9). The IM/VOIP service client can be developed and installed on any type of computer with a suitable operating system and software libraries. Accordingly, the claimed method contains duplex transmission of voice streams using the audio interface of a smartphone and the audio interface of a computer between client applications of a smartphone mobile phone and IM/VOIP client applications of a computer of any type.

Duplex transmission of voice streams between mobile phone client applications and smartphone IM/VOIP client applications based on the method described above provides safe and operating system-permitted capabilities for manipulating audio streams of smartphone voice communication applications to develop new applications and services that are interesting to ordinary users without providing exclusive rights to the user. For example, root for Android and jailbreak for IOS. Accordingly, the solution can be used by a huge audience of smartphone users within the framework of the security policy of operating system developers.

As a consequence of the application of the technical result of the method described above, an invention is claimed for a method for implementing a PBX, that is, a mini-PBX that connects mobile network subscribers and IM/VoIP service clients without the use of additional remote services. The technical problem to be solved by the claimed invention can be formulated as the development of a method for implementing a PBX for organizing a conversational connection between mobile phone clients and IM/VOIP clients using the audio interface of a smartphone without involving resources of remote services.

The technical result of the PBX implementation is achieved through the use of specially configured smartphones with appropriate interfaces in aspects and variants corresponding to the method of duplex transmission of voice streams described above between mobile phone client applications and IM/VOIP client applications using a connection of audio outputs to audio inputs smartphone audio interface, as well as automatic, without direct tactile communication with the user, control of the mobile phone client application and the IM/VOIP client application using smartphone software for routing and switching connections between remote subscribers of the telephone network and remote IM/VOIP clients. In fact, all PBX functionality required for duplex transmission of voice streams between remote telephone network subscribers and remote IM/VOIP clients is implemented in the hardware and software of basic smartphones using the appropriate resources of mobile and IM/VOIP networks, but without using the functions of third-party additional PBX. Corresponding examples are illustrated in FIG. 6, FIG. 7 and FIG. 8.

In the case of using a third-party additional PBX for routing and switching connections between remote subscribers of the telephone network and remote IM/VOIP clients, a managed structure that functionally corresponds to the implementations of the method of duplex transmission of voice streams described above between mobile phone client applications and IM/VOIP client applications base smartphone will have the VoIP-Cell gateway functionality illustrated as an example in FIG. 9. Such third-party PBX can be implemented not only on a "separate" hardware platform, but also directly on the hardware platform of one of the basic smartphones.

The claimed invention includes some aspects of the types of routing that can be used on a PBX for connections between remote telephone network subscribers and remote IM/VOIP clients. For example, remote clients of an IM/VoIP service can be internal PBX subscribers, united for both corporate interaction and non-commercial communication.

In one aspect, the claimed invention additionally includes a method that includes routing a connection between remote subscribers of a telephone network and remote clients of an IM/VoIP service, containing an IVR system implemented using smartphone software and included in a conversational channel connecting counter voice streams of the client IM/VoIP application and telephone application using smartphone audio interfaces by dialing numbers in DTMF mode by the remote calling party to select the contact of the remote called party.

Routing a connection between remote subscribers of the telephone network and remote clients of the IM/VoIP service using an IVR system can occur as follows. Incoming calls are sent from the mobile network to the basic smartphone and then connected to the IVR system. The calling remote subscriber of the telephone network, based on IVR suggestions, selects the called remote IM/VoIP client. Next, the call, under the control of the appropriate software agent, is routed through the IM/VoIP client installed on the base smartphone to the remote IM/VoIP client, which can be one of the PBX subscribers (Details in the comments to FIG. 6).

Incoming calls are received from the IM/VoIP service network to the base smartphone and then connected to the IVR system. The calling remote IM/VoIP client, based on IVR suggestions, selects the called remote subscriber of the telephone network. Next, the call, under the control of the appropriate software agent, is routed through the mobile phone client installed on the base smartphone to the remote called subscriber of the telephone network. (Details in the comments to FIG. 7). After the remote parties respond, a conversational connection is established.

In another aspect, the claimed invention additionally includes a method that contains routing connections between remote telephone network subscribers and remote clients of the IM/VoIP service, containing a DTMF tone signal receiver implemented using smartphone software and included in a conversational channel connecting in duplex mode, voice streams between the IM/VOIP client application of the base smartphone and the mobile phone client application of the base smartphone using the audio interfaces of the smartphone, which is carried out based on dialing DTMF numbers of the remote called party number transmitted by the remote calling party. Routing the connection between the calling remote subscriber of the telephone network and the called remote client of the IM/VoIP service can occur as follows (Details in the comments to FIG. 6).

Incoming calls are received from remote subscribers of the telephone network to the mobile telephone client installed on the base smartphone, followed by connecting a DTMF signal receiver on the base smartphone. After the automatic response of the called mobile telephone client under the control of the corresponding software agent of the base smartphone, the calling remote subscriber of the telephone network in DTMF mode dials the number of the called remote client of the IM/VoIP service. Next, the call, under the control of the appropriate software agent, is routed through the IM/VoIP service client installed on the base smartphone to the remote IM/VoIP service client. After the remote parties respond, a conversational connection is established.

Routing the connection between the calling remote client of the IM/VoIP service and the called subscriber of the telephone network can occur as follows (Details in the comments to FIG. 7). Incoming calls are received from remote IM/VoIP service clients to the IM/VoIP service client installed on the base smartphone, followed by turning on the DTMF signal receiver on the base smartphone. After the automatic response of the called IM/VoIP client of the basic smartphone under the control of the corresponding software agent, the calling remote client of the IM/VoIP service in DTMF mode dials the number of the called remote subscriber of the telephone network. Next, the call, under the control of the corresponding software agent, is routed through the mobile client of the basic smartphone to a remote subscriber of the telephone network. After the remote parties respond, a conversational connection is established.

In yet another aspect, the claimed invention further includes a method that includes routing a connection between remote subscribers of a telephone network and remote clients of an IM/VoIP service, which is carried out based on text messages transmitted by the remote calling party. Routing connections between remote subscribers of the telephone network and remote clients of the IM/VoIP service based on text messages can occur as follows.

To route the connection between a remote calling IM/VoIP service client and a remote called telephone network subscriber, the telephone network subscriber number is transmitted from the calling remote IM/VoIP service client to the IM/VoIP service client installed on the base smartphone via text message in the appropriate chat. Next, one call from the base smartphone under the control of the corresponding software agent is sent through the mobile telephone client installed on the base smartphone to a remote subscriber of the telephone network. The second call from the base smartphone is routed through the IM/VoIP client installed on the base smartphone, controlled by the appropriate software agent, to the remote IM/VoIP client. After the remote parties respond, a conversational connection is established (Details in the comments to FIG. 7).

To route the connection between a remote telephone network caller and a called remote IM/VoIP service client, the remote mobile network subscriber sends to the mobile telephone network client installed on the base smartphone a text message containing the number or name of the IM/VoIP service client. The call is then routed through the IM/VoIP client installed on the base smartphone, under the control of the appropriate software agent, to the number or name of the remote IM/VoIP client received from this text message. The second call from the base smartphone, under the control of the corresponding software agent, is directed from the mobile telephone network client installed on the base smartphone to a remote telephone network subscriber. After the remote parties respond, a conversational connection is established (Details in the comments to FIG. 6).

In the next aspect, the claimed invention additionally includes a method comprising routing a connection between calling remote clients of the IM/VoIP network service and called remote subscribers of the telephone network based on messages transmitted by remote calling clients of the IM/VoIP service over a data network and containing contact details of the remote called party. (Details in the comments to FIG. 7). Routing the connection between calling remote clients of the IM/VoIP network service and called remote subscribers of the telephone network based on messages transmitted over the data network can occur as follows.

To route the connection between a remote calling IM/VoIP service client and a called remote telephone network subscriber, the telephone network subscriber number is transmitted from the calling IM/VoIP service client to the IM/VoIP service client installed on the base smartphone by a corresponding message over the data network. Next, one call from the base smartphone under the control of the corresponding software agent is sent through the mobile telephone client installed on the base smartphone to a remote subscriber of the telephone network. The second call from the base smartphone is routed through the IM/VoIP client installed on the base smartphone, controlled by the appropriate software agent, to the remote IM/VoIP client. After the remote parties respond, a conversational connection is established (Details in the comments to FIG. 7). Routing messages can be transmitted both over the local network of a household or enterprise, and over the Internet.

In yet another aspect, the claimed invention additionally includes a method that includes routing a connection between remote telephone network subscribers and remote IM/VoIP service clients, which is carried out based on a voice command coming from the calling party and containing contact information of the remote called party. Routing based on voice command can occur as follows.

To route the connection to the called client of the remote party, the user of the calling client of the remote party, after establishing a connection with the base smartphone under the control of the corresponding software agent, uses a voice command containing contact information to establish a connection between the base smartphone and the remote called party. After the remote parties respond, a conversational connection is established (Details in the comments to FIG. 6 and FIG. 7).

In another aspect, the claimed invention further includes a method that includes static routing, where the call can only be transferred to a predetermined remote telephone network subscriber or remote IM/VoIP client. Static routing can happen as follows.

Only one called remote client of the IM/VoIP service is predefined to route the connection from the calling remote subscriber to the telephone network. Thus, after answering a call from a remote telephone subscriber by the mobile phone client application of the base smartphone, the connection is routed to a predetermined remote client of the IM/VoIP service under the control of the corresponding software agent (Details in the comments to FIG. 6).

Only one called subscriber number of the telephone network is predefined to route the connection from the calling remote IM/VoIP service client. Thus, after a call from a remote IM/VoIP client is answered by the IM/VoIP client application of the base smartphone, the connection is routed to a predetermined number of the telephone network subscriber under the control of the corresponding software agent (Details in the comments to FIG. 7).

In yet another aspect, the claimed invention additionally includes a method that includes "manual" routing carried out directly by the user of the base smartphone, who, using the mobile phone application and the smartphone IM/VOIP client application using the smartphone's on-screen interface, independently establishes a connection with the remote telephone network subscriber and remote client of the IM/VoIP service. This type of routing can happen as follows.

The user of a basic smartphone (or smartphones) independently establishes a conversational connection with the calling or called remote subscriber of the telephone network and with the calling or called remote client of the IM/VOIP service by answering an incoming call or making a call using the on-screen interface of the smartphone. Accordingly, a conversational connection is established between the remote subscriber of the telephone network and the remote client of the IM/VoIP service via an audio channel connecting through the smartphone interfaces the mobile phone client installed on the base smartphone and the IM/VoIP client installed on the base smartphone. (Details in the comments to FIG. 6 and FIG. 7).

Any PBX subscriber, who is also a remote client of the IM/VoIP service, can make a call by transferring the telephone number of the called subscriber of the telephone network from the remote client of the IM/VoIP service (PBX subscriber) to the IM/VoIP client installed on the base smartphone, to any subscriber of the telephone network using any of the above methods.

Accordingly, any remote subscriber of the telephone network can make a voice call to any PBX subscriber, who is also a remote client of the IM/VoIP service, by transferring the contact data of the called remote client of the IM/VoIP service from the remote subscriber of the telephone network to the mobile phone client installed on a basic smartphone, using any of the above methods.

Thus, based on the principles of the claimed invention, it is possible to use PBXs of various configurations in practice. In particular, FIG. FIG. 8 illustrates a specific example of a PBX implementation that uses two mobile telephone clients installed on smartphones as external lines and six remote IM/VoIP clients as internal subscribers (PBX 2×6).

As a consequence of the application of the technical result described above for the method of duplex transmission of voice streams between a mobile application client of a smartphone mobile phone and a mobile application client VOIP of a smartphone using the audio interface of a smartphone, an invention is claimed for a method for implementing a VoIP-Cell gateway for broadcasting voice traffic between the application a smartphone mobile phone client and a VoIP client application running IP-PBX using the smartphone's audio interface. The technical problem to which the claimed invention is aimed can be formulated as the development of a method for implementing a VoIP-Cell gateway with the above properties. As a result of the implementation of the claimed invention, it becomes possible to use appropriately configured smartphones as a VoIP-Cell gateway as part of an IP-PBX.

The technical result of implementing a VoIP-Cell gateway is achieved through the use of smartphones with appropriate interfaces, specially configured according to the aspects and method variants described above for duplex transmission of voice streams between the smartphone mobile phone client application and the smartphone VOIP client application using a connection of audio outputs with audio inputs of the smartphone audio interface, as well as:
- controlling the smartphone mobile phone client application and the smartphone VoIP client application from the IP-PBX side using the smartphone software;
- switching and routing connections between remote subscribers of the telephone network and subscribers of accessible IP-PBX networks using a mobile phone client application on a smartphone and a VoIP client application on a smartphone running IP-PBX.

That is, a smartphone with the corresponding interfaces configured contains software in the form of an agent for managing the VoIP service application and the client mobile application. In turn, this agent is controlled by IP-PBX. Thus, this basic smartphone is an IP-PBX component and an object for initiating communication and routing voice streams under IP-PBX control, as well as a client device for the IP-PBX VoIP server (FIG. 9).

In one aspect, the claimed invention further includes a method that includes an implementation of an IP-PBX, a VoIP service application management agent, and a client mobile phone application using smartphone software for managing switching and routing between clients of accessible IP-PBX networks, including remote ones telephone network subscribers. That is, a smartphone with the appropriate interfaces configured contains not only the VoIP service application software, the client mobile phone application and the application data management agent, but also the IP-PBX software, which includes a VoIP server. Accordingly, the additional functionality of IP-PBX, implemented on the basis of a smartphone, controls the switching and routing of not only the VoIP service application client of the base smartphone, but also VoIP network clients registered on the IP-PBX installed on the smartphone (FIG. 9).

These and other aspects and advantages of the claimed invention will become apparent to those skilled in the art upon reading the following detailed description with reference to the accompanying drawings. In addition, it should be understood that all descriptions are intended to be exemplary only and not limiting of the claimed invention.

BRIEF DESCRIPTION OF THE DRAWINGS

The accompanying drawings, incorporated herein, illustrate several aspects of the invention and, together with the description, serve to explain the principles of the invention. In the drawings, the same or similar reference numerals indicate like elements.

DETAILED DESCRIPTION OF THE INVENTION

The following material contains detailed descriptions and drawings of various exemplary implementations for the most complete understanding of the claimed invention and the corresponding technical results. This material provides necessary information to enable those skilled in the art to understand the concepts of the invention and contains exemplary embodiments of the invention in practice. The following detailed description does not limit the invention, the scope of which is defined by the claims.

Embodiments of the claimed inventions provide methods for duplex transmission of voice streams between a mobile application client of a mobile phone and a mobile application client IM/VOIP of a smartphone and the corresponding implementation of a PBX and VoIP-Cell gateway using the audio interface of a smartphone. In accordance with the claimed invention, a user can make a direct voice call directly from an IM/VoIP client application to a remote subscriber of a mobile telephone network, just as a subscriber of a mobile telephone network can directly call a remote client of an IM/VoIP service without using paid remote services.

In addition, as a consequence of the application of the technical result of the method for duplex transmission of voice streams between a mobile phone client and an IM/VOIP client installed on a smartphone, the material presented below contains example options for a method for implementing a PBX that connects mobile network subscribers and IM/VoIP service clients without the use of remote services, as well as a method for implementing a VoIP-Cell gateway for broadcasting voice traffic between a smartphone mobile phone client application and a smartphone VoIP client application running IP-PBX.

Figure 1:
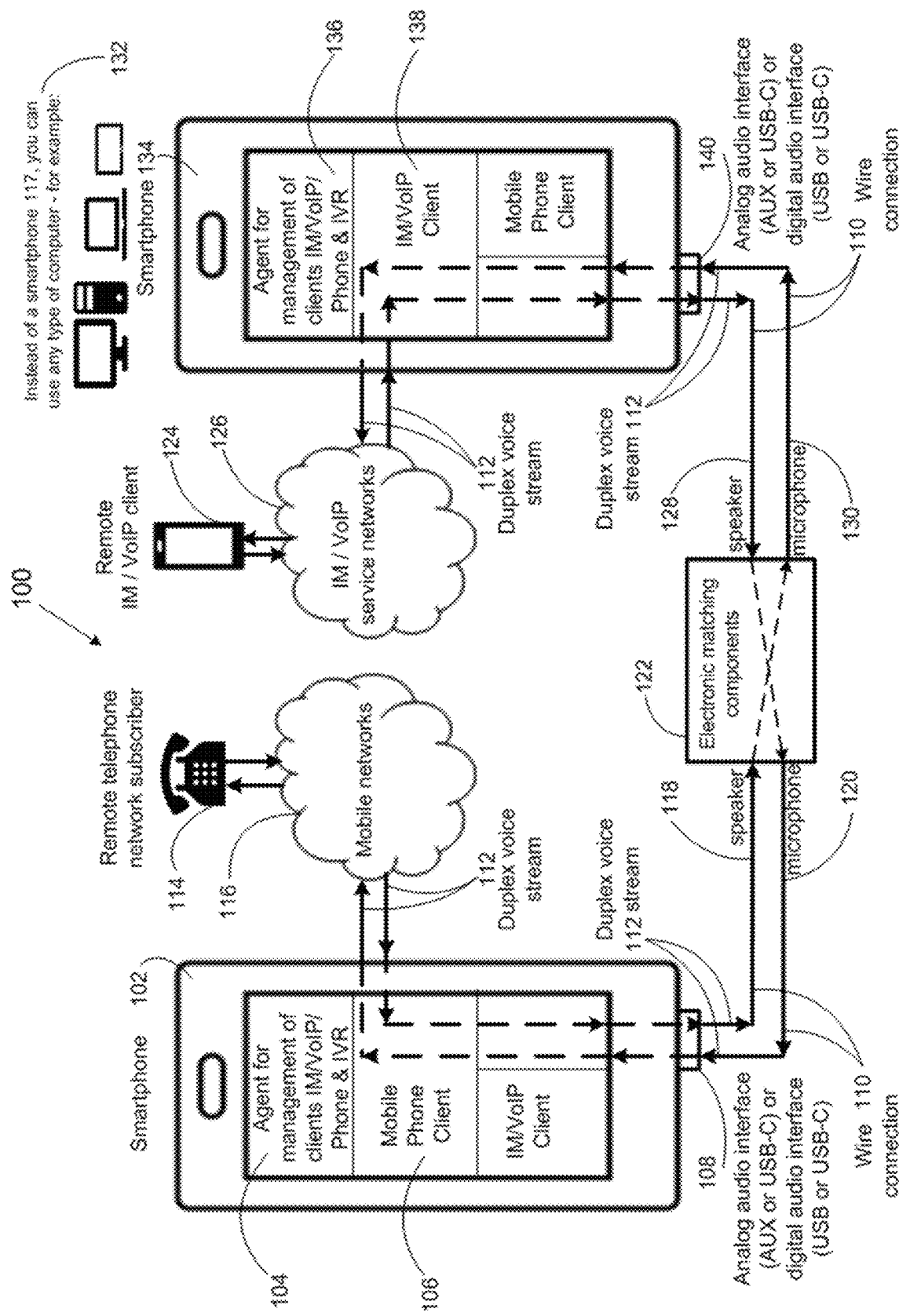
FIG. 1 Illustrates the option of duplex transmission of voice streams between the mobile application client of a mobile phone of one smartphone and the mobile application IM/VOIP client of another smartphone via an electrically matched wired analog or digital connection of the audio outputs of one smartphone with the audio inputs of another smartphone of the audio interfaces of smartphones.

FIG. 1, 2, 3 illustrate embodiments of a method that includes duplex transmission of voice streams between two smartphones over an electrically matched wired connection of the audio outputs of one smartphone to the audio inputs of another smartphone of smartphone audio interfaces. Functionally identical objects shown in the drawings may be designated by the same reference numerals.

FIG. 1 illustrates a variant of duplex transmission of voice streams over a wired analog connection of audio outputs with audio inputs of analog wired audio interfaces of smartphones. The pre-analog audio output 118 of the smartphone 102 for connecting the speaker is connected by wire 110 through the electronic matching components 122 to the audio input for connecting the microphone 130 of the smartphone 134, and the analog audio output 128 of the smartphone 134 for connecting the speaker is connected by wire 110 through the electronic matching components 122 with the audio input for connecting the microphone 120 of the smartphone 102. That is, the audio input of one smartphone and the audio output of another smartphone are cross-connected through matching electronic components. Instead of a smartphone 134, you can use any type of computer (132). And AUX or USB-C connectors can be used as analog interfaces for smartphones 108 and 140.

The remote subscriber of the telephone network 114 establishes a conversational connection with the mobile client 106 installed on the base smartphone 102, via the network of the mobile operator 116. To answer a call or dial the number of the remote subscriber of the telephone network 114, the mobile telephone client 106 installed on the smartphone 102, managed by the Phone and IM/VoIP client 104 management agent.

The remote client of the IM/VoIP service 124 establishes a conversational connection with the IM/VOIP client 138 installed on the base smartphone 134 over the network of the IM/VOIP service 126. To answer the call or call the contact of the remote IM/VoIP client 124, the IV VoIP client 138 is managed by the Phone and IM/VoIP 136 client management agent.

During a conversation between the remote telephone network subscriber 114 and the remote IM/VoIP client 124, counter audio streams are routed between the analog or digital audio interfaces 108 and 140 of both smartphones over a wired connection through electrical matching components 122. As a result, between the remote telephone network subscriber 114 and the remote IM/VoIP client 124 establishes a full duplex conversational connection 112. Instead of a smartphone 134, you can use any type of computer (132). For example, PC, laptop, tablet, etc.

Figure 2:
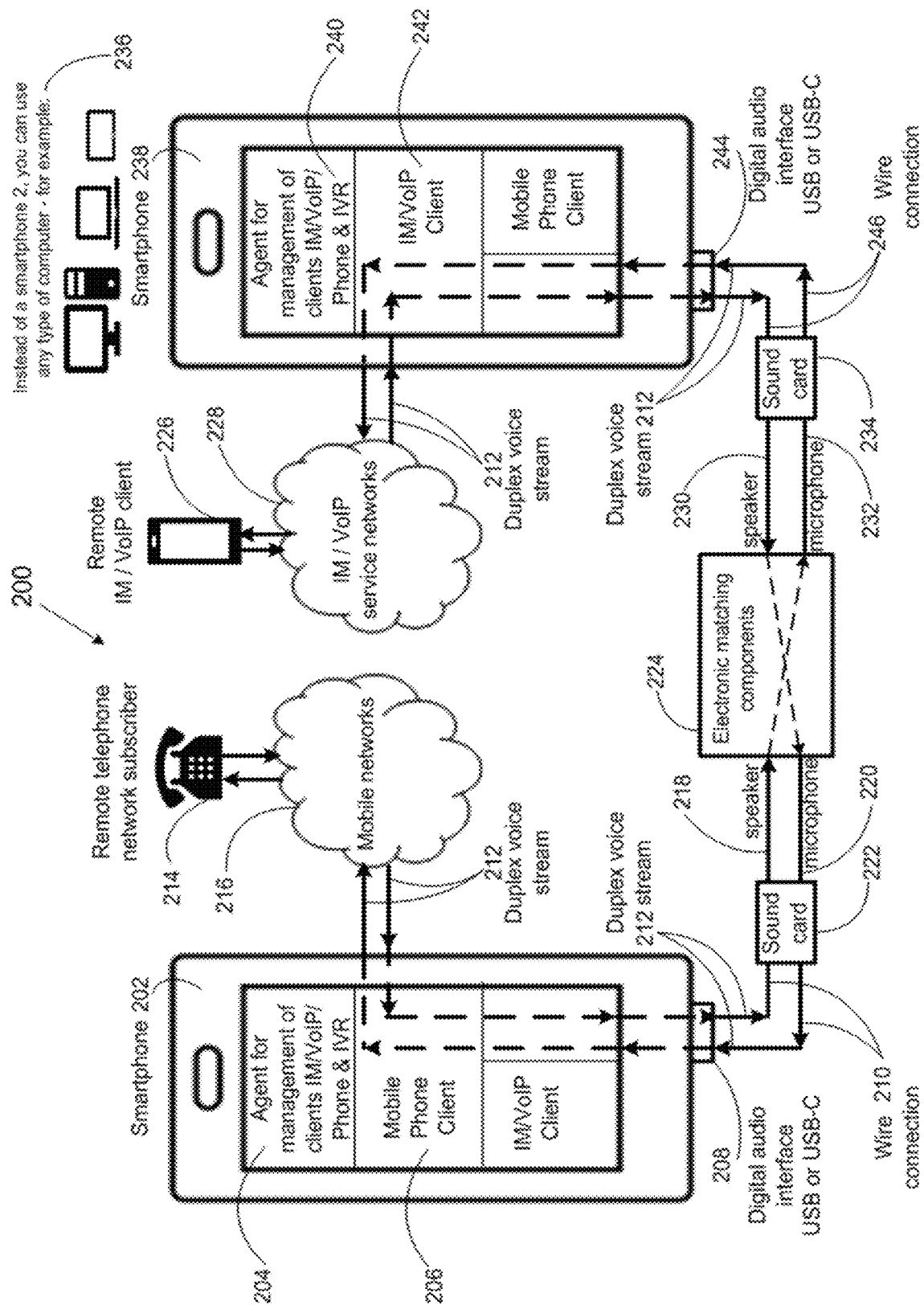
FIG. 2 Illustrates the option of duplex transmission of voice streams between the mobile application client of the mobile phone of one smartphone and the mobile application IM/VOIP client of another smartphone via an electrically matched wired digital connection of the audio outputs of one smartphone with the audio inputs of another smartphone of the audio interfaces of smartphones using "external" sound cards.

FIG. 2 illustrates a variant of duplex transmission of voice streams over a wired digital connection of audio outputs with audio inputs of digital wired audio interfaces of smartphones. This option, like the previous one, contains a wired connection of two smartphone interfaces. Therefore, drawing FIG. 2 is structurally similar to drawing FIG. 1 and is distinguished by the presence of digital audio interfaces for smartphones 208 and 244 with corresponding sound cards 222 and 234 instead of analog audio interfaces.

The pre-digital audio interface 208 of the smartphone 202 is connected by wire 210 to the sound card 222, and the digital audio interface 244 of the smartphone 238 is connected by wire 246 to the sound card 234. Instead of the smartphone 238, any type of computer (236) can be used.

Next, the analog audio output 218 of the sound card 222 for connecting the speaker is connected by wire through electronic matching components 224 with the audio input for connecting the microphone 232 of the sound card 234, which is connected via a wired connection 246 to the digital audio interface 244 of the smartphone 238, and the analog audio output 230 of the sound card 234 for connecting the speaker is connected by wire through electronic matching components 224 to the audio input for connecting the microphone 220 of the sound card 222, which is connected via a wire connection 210 to the digital audio interface 208 of the smartphone 202. That is, the digital audio input of one smartphone and the audio output of another smartphones and vice versa are cross-connected through electronic matching components 224 and corresponding sound cards 222 and 234. Instead of a smartphone 238, any type of computer (236) can be used. And USB or USB-C connectors can be used as digital interfaces for smartphones 208 and 244.

The remote subscriber of the telephone network 214 establishes a conversational connection with the mobile client 206 installed on the base smartphone 202, over the network of the mobile operator 216. To answer a call or dial the number of the remote subscriber of the telephone network 214, the mobile telephone client 206 installed on the smartphone 202, managed by the Phone and IM/VoIP client 204 management agent.

The remote IM/VoIP service client 226 establishes a conversational connection with the IM/VOIP client 242 installed on the base smartphone 238 over the IM/VOIP service 228 network. To answer the call or call the contact of the remote IM/VoIP client 226, the IM client/VoIP 242 installed on smartphone 238 is managed by Phone and IM/VoIP client management agent 240.

During a conversation between a remote subscriber to the telephone network 214 and a remote IM/VoIP client 226, counter audio streams are routed between the digital audio interfaces 208 and 244 of both smartphones over a wired connection through electronic matching components 224 and corresponding sound cards 222 and 234. As a result, a full duplex conversational connection 212 is established between the remote subscriber of the telephone network 214 and the remote IM/VoIP client 226. Instead of a smartphone 238, you can use any type of computer (236). For example, PC, laptop, tablet, etc.

Figure 3:
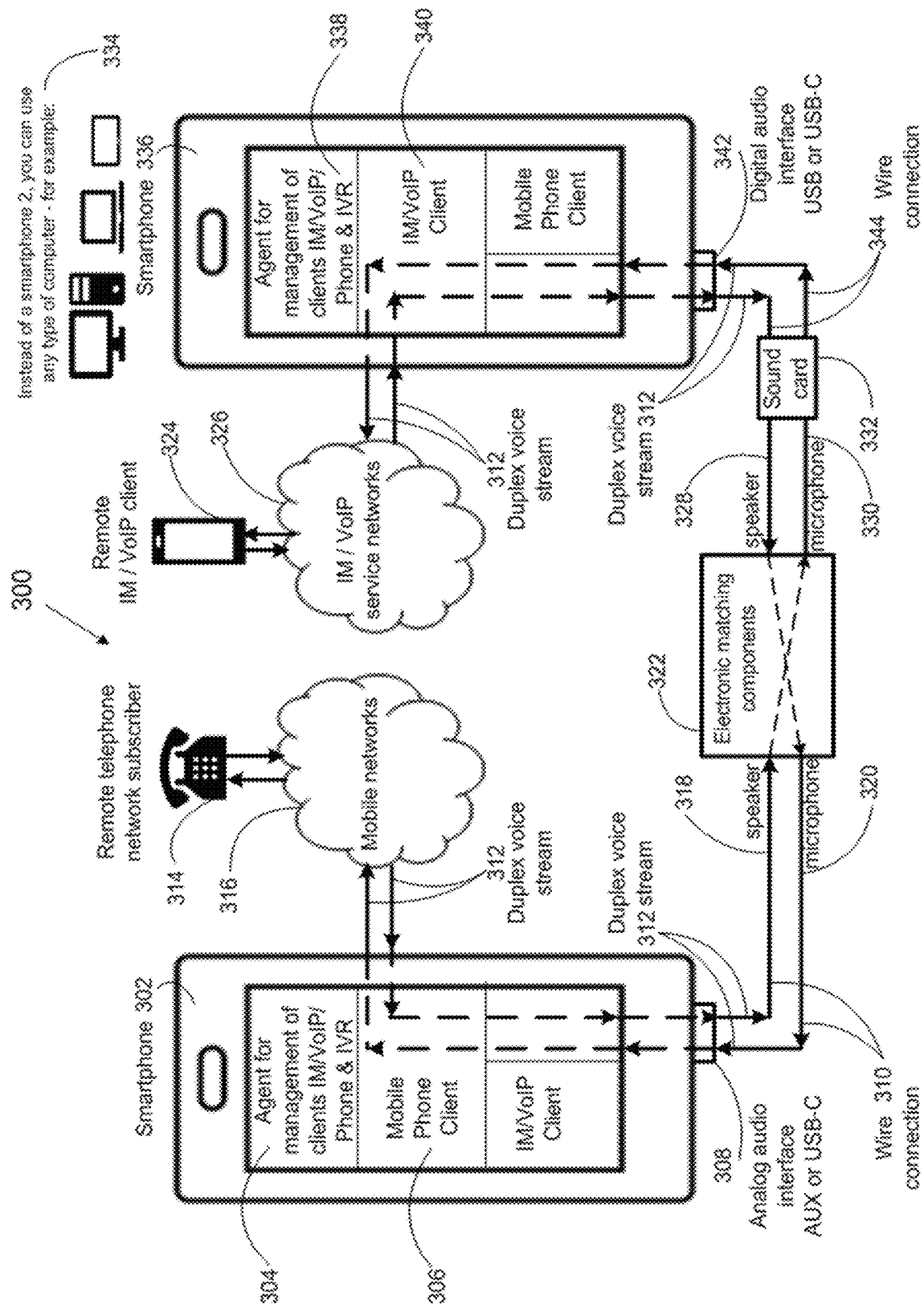
FIG. 3 Illustrates the option of duplex transmission of voice streams between the mobile application client of a mobile phone of one smartphone and the mobile application IM/VOIP client of another smartphone via a wired analog connection of audio outputs and audio inputs of one smartphone with analog audio inputs and audio outputs of a sound card connected to digital wired audio interface of another smartphone.

FIG. 3 illustrates a variant of duplex transmission of voice streams over a wired analog connection of the audio output and audio input of one smartphone with the analog audio input and audio output of a sound card connected to the digital wired audio interface of another smartphone. This option involves connecting a sound card with analog audio input and output to the digital interface of one of the smartphones, which are connected to the analog audio input and output of another smartphone through electronic matching components. The sound card is connected to the USB or USB-C interface of the smartphone. AUX or USB-C connectors 308 can be used as analog interfaces for smartphone 302. USB or USB-C connectors 342 can be used as digital interfaces for smartphone 336. Instead of smartphone 336, you can use any type of computer (334).

This option, like previous options, contains a wired connection of two smartphone interfaces. Therefore, drawing FIG. 3 is structurally similar to the drawings FIG. 1 and FIG. 2, but contains differences in the use of the digital 342 and analog 308 audio interface of smartphones 336 and 302. In this case, the digital audio interface 342 of smartphone 336 contains a connection to the sound card 332, and smartphone 302 uses only the analog interface 308.

The analog audio output 318 of the smartphone 302 for connecting the speaker is connected by wire 310 through electronic matching components 322 to the audio input for connecting the microphone 330 of the sound card 332, which is connected via a wired connection 344 to the digital audio interface 342 of the smartphone 336, and the analog audio output 328 of the sound card 332 for connecting the speaker is connected by wire 310 through electronic matching components 322 to the audio input for connecting the microphone 320 of the analog audio interface 308 of the smartphone 302. Instead of a smartphone 336, you can use any type of computer (334). That is, the digital audio input of one smartphone and the analog audio output of another smartphone and the digital audio output of one smartphone and the analog audio input of another smartphone are cross-connected, respectively, through electronic matching components 322 and the corresponding sound card 332.

The remote subscriber of the telephone network 314 establishes a conversational connection with the mobile client 306 installed on the base smartphone 302 over the network of the mobile operator 316. To answer a call or dial the number of the remote subscriber of the telephone network 314, the mobile telephone client 306 installed on the smartphone 302, managed by the Phone and IM/VoIP 304 client management agent.

The remote IM/VoIP service client 324 establishes a conversational connection with the IM/VOIP client 340 installed on the base smartphone 336 over the IM/VOIP service 326 network. To answer the call or call the contact of the remote IM/VoIP client 324, the IM client/VoIP 340 installed on smartphone 336 is managed by Phone and IM/VoIP client management agent 338.

During a conversation between a remote subscriber to the telephone network 314 and a remote IM/VoIP client 324, counter audio streams are routed between the audio interface 308 of the smartphone 302 and the digital audio interface 342 of the smartphone 336 over a wired connection through the electronic matching components 322 and the associated sound card 332. As a result, a full duplex conversational connection 312 is established between the remote subscriber of the telephone network 314 and the remote IM/VoIP client 324. Instead of a smartphone 336, you can use any type of computer (334). For example, PC, laptop, tablet, etc.

Figure 4:
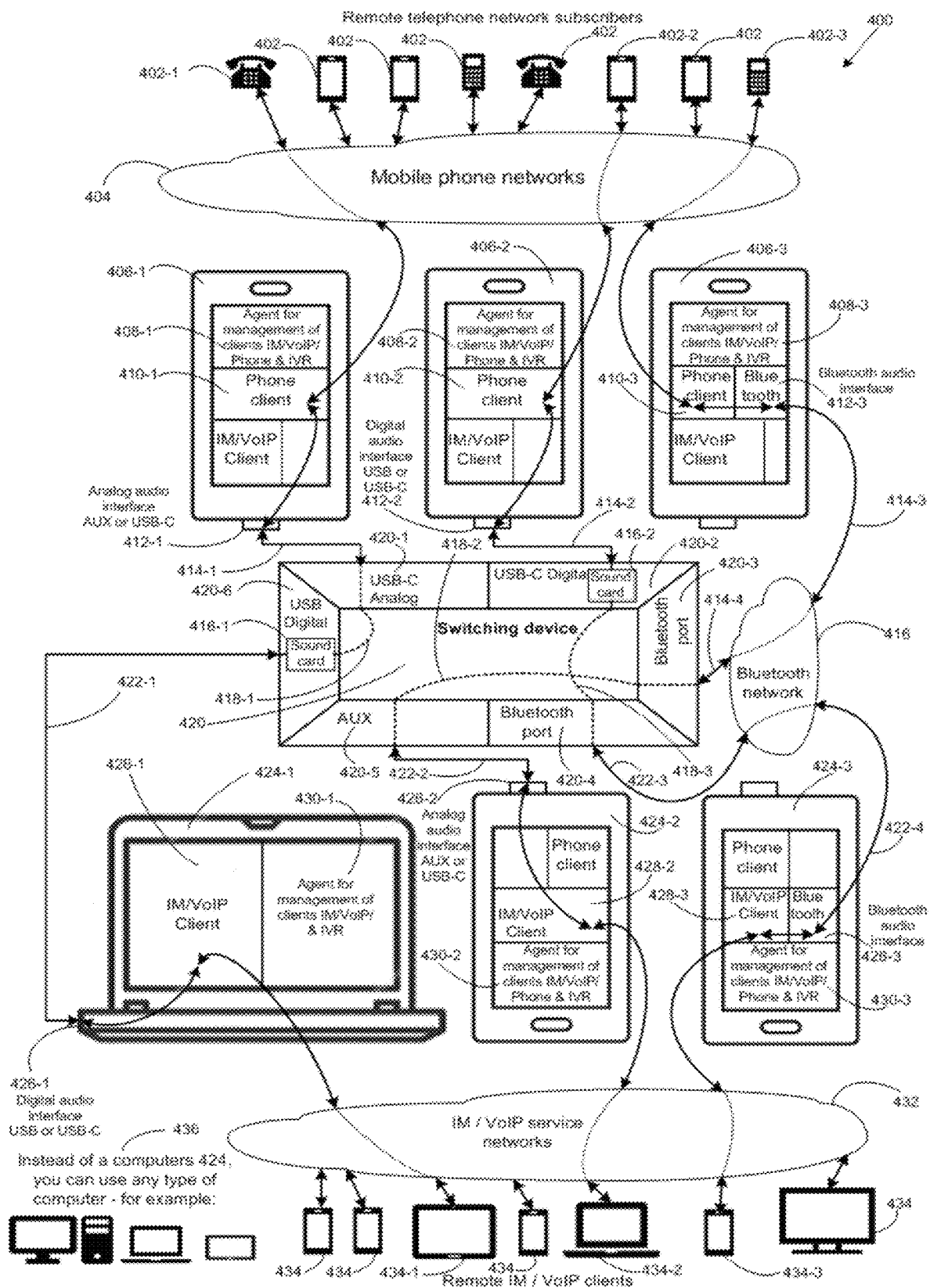
FIG. 4 Illustrates an exemplary embodiment of a method for duplex transmission of voice streams between a mobile application client of a mobile phone of one smartphone and a mobile application client IM/VOIP of another smartphone with subsequent connection of audio outputs to audio inputs on a switching device with the possibility of simultaneous preliminary connection of several smartphones using Bluetooth wireless interfaces, and via wired digital and analog interfaces.

FIG. 4 illustrates an exemplary embodiment of a method that includes duplexing voice streams and then connecting audio outputs to audio inputs on a switching device with the ability to connect to more than one smartphone at a time. The exchange of voice streams between communication voice clients of smartphones (and, accordingly, between remote subscribers 402 of the telephone network 404 and remote clients 434 of the IM/VOIP service network 432) occurs through a switching device 420, which provides for the simultaneous connection of several basic smartphones or computers of any type via wireless interfaces Bluetooth, and via wired digital and analog interfaces.

Automatic management of mobile phone clients and IM/VOIP clients installed on a smartphone is implemented by smartphone software through Phone and IM/VoIP client management agents 408-1, 408-2, 408-3 and 430-1, 430-2, 430-3.

It is clear that synchronization of the work of clients of communication applications, control of switching and establishment of conversational connections based on the proposed method can be implemented in completely different ways, including the capabilities of the switching device. The claimed method and, accordingly, FIG. 4 contains precisely the fact of transmitting duplex audio between communication applications through a communication device with the ability to automatically control this process. More detailed implementations based on this concept (some of the possible ones) will be presented below in the form of the claimed methods for implementing a PBX and VoIP-Cell gateway.

For clarity, an example diagram of the connection through a switching device of several smartphones and a laptop contains various audio interfaces that can be used in practice. Therefore, presented in FIG. 4 drawing includes functionally identical objects. Functionally identical objects shown in FIG. 4 are designated by the same reference numerals with different extensions.

Smartphones with active telephone clients are designated by reference numbers 406-1, 406-2 and 406-3. A computer in laptop format with an active IM/VoIP client is designated by reference number 424-1, smartphones with active IM/VoIP clients are designated by reference numbers 424-2 and 424-3.

FIG. 4 contains a pre-connection of audio interface ports (420-1 and 420-6, 420-2 and 420-4, 420-3 and 420-5) directly on the switching device 420, installed in the switching phase of the voice connection between remote and core communication clients, for duplex transmission of voice streams between these ports. This preliminary connection can occur using any algorithm, including random selection of any free "counter" port. Illustration and description FIG. 4 represents only an exemplary implementation of the corresponding method for the most complete understanding of the essence of the invention, the scope of which is determined by the claims.

Previously, the switching device 420 is connected to the smartphones 406-1, 406-2, 406-3, 424-2, 424-3 and the computer 424-1 with the same type of audio interfaces. Remote subscribers of the telephone network 402-1, 402-2, 402-3 establish a conversational connection with the corresponding telephone clients 410-1, 410-2, 410-3 of the corresponding basic smartphones 406-1, 406-1, 406-3 via the mobile network operator 404. To answer a call or dial a number of a remote subscriber of the telephone network 402-1, 402-2, 402-3, the telephone client 410-1, 410-2, 410-3 is controlled by the corresponding Telephone and IM/VoIP client management agent 408-1, 408-2, 408-3.

Remote clients of the IM/VoIP service 434-1, 434-2, 434-3 establish a conversational connection with the corresponding IM/VOIP clients 428-1, 428-2, 428-3 installed respectively on the computer 424-1 and base smartphones 424-2, 424-3, via the IM/VOIP service network 432. To answer a call or call a contact of a remote IM/VoIP client 434-1, 434-2, 434-3 IM/VoIP client 428-1, 428-2, 428-3 is managed by the corresponding Phone and IM/VoIP client management agent 430-1, 430-2, 430-3.

The analog AUX or USB-C interface 412-1 of the base smartphone 406-1 has a matched wired connection 414-1 to the analog USB-C port 420-1 of the switching device 420. The computer 424-1 via a digital USB or USB-C interface The 426-1 has a wired connection 422-1 to the digital USB port 420-6 of the switching device 420 containing the sound card 416-1. Accordingly, audio interfaces 412-1 and 426-1 via connection 418-1 of switching device 420 are switched for duplex transmission of audio streams. As a result, a full duplex conversational connection is established between the remote telephone subscriber 402-1 and the remote IM/VoIP client 434-1.

The USB or USB-C digital interface 412-2 has a wired connection 414-2 to the USB-C digital port 420-2 of the switching device 420 containing the sound card 416-2. The Bluetooth interface 426-3 of the smartphone 424-3 is connected via a wireless connection 422-3 and 422-4 of the Bluetooth network 416 to the similar Bluetooth port 420-4 of the switching device 420. Accordingly, the audio interfaces 412-2 and 426-3 via the connection 418-3 of the device switching 420 are switched for duplex transmission of audio streams. As a result, a full duplex conversational connection is established between the remote telephone subscriber 402-2 and the remote IM/VoIP client 434-3.

The analog AUX or USB-C interface 426-2 of the smartphone 424-2 has a matched wired connection 422-2 to the analog AUX port 420-5 of the switching device 420. The Bluetooth interface 412-3 of the smartphone 406-3 communicates via a wireless connection 414-3 and 414-4 of the Bluetooth network 416 with a similar Bluetooth port 420-3 of the switching device 420. Accordingly, audio interfaces 412-3 and 426-2 via connection 418-2 of the switching device 420 are switched for duplex transmission of audio streams. As a result, a full duplex conversational connection is established between the remote telephone subscriber 402-3 and the remote IM/VoIP client 434-2.

Instead of computers 424, any type of computer (436) can be used. For example, PC, laptop, tablet, etc.

Figure 5:
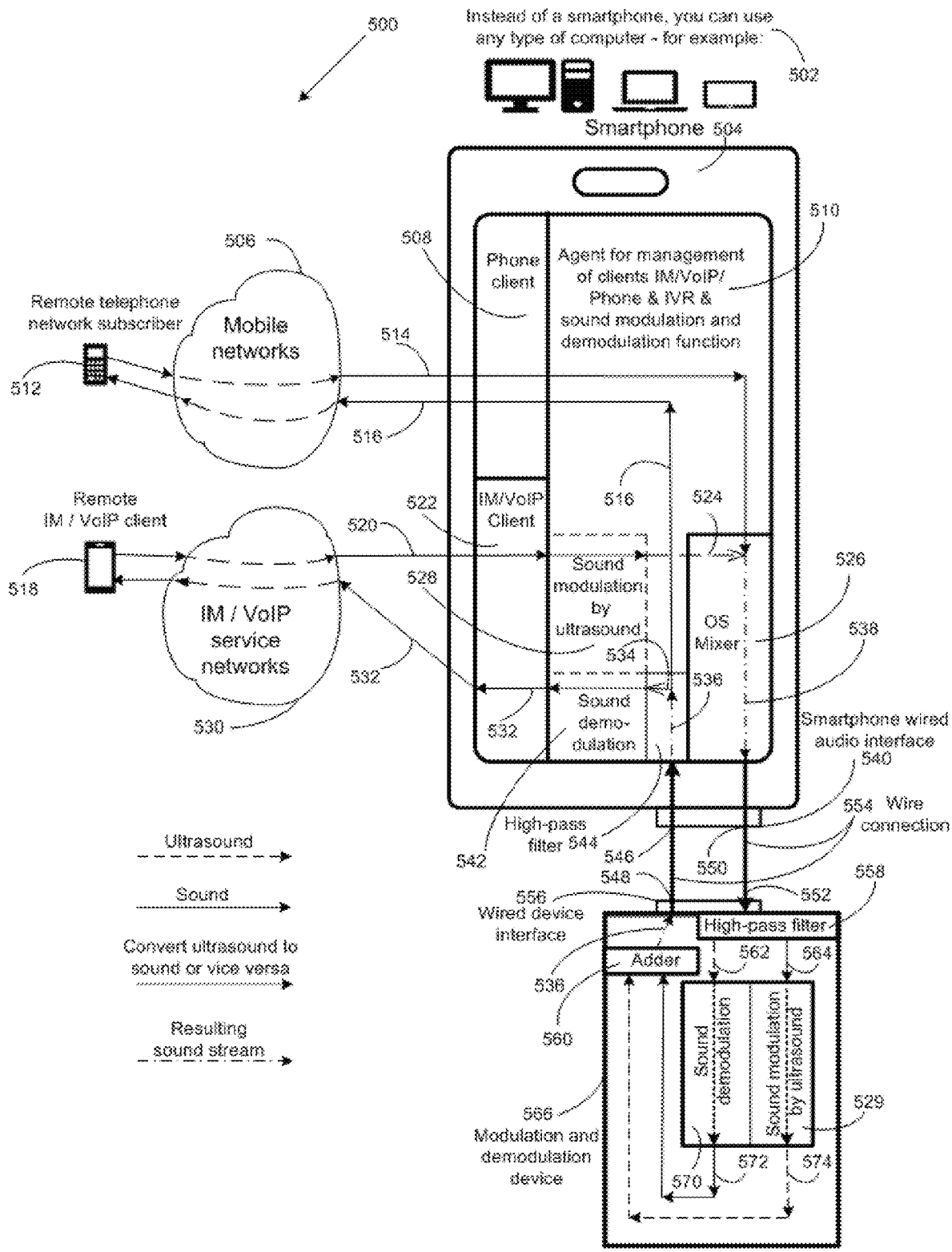
FIG. 5 Illustrates a method for implementing duplex transmission of voice streams over an electrically matched wired connection using a connection between the audio output and the audio input of a smartphone audio interface through a modulation and demodulation device between a mobile phone client application and an IM/VOIP client application running on the same smartphone with channel separation voice streams between these applications.

FIG. 5 illustrates an exemplary embodiment of a method that comprises duplex transmission of voice streams over an electrically matched wired connection using an audio output to audio input connection of a smartphone audio interface between a phone client and an IM/VOIP client installed on the same smartphone, separating the voice streams between the phone client and the IM/VOIP client. A phone client and an IM/VOIP client installed on the same smartphone broadcast to the same common audio output and receive an audio stream from the same common audio input, and the audio input and audio output of the smartphone are physically connected via an electrically matched wired connection 554 through a modulation-demodulation device 566, which also contains electronic matching components, to separate voice streams from different communication voice clients and eliminate mutual interference.

Analog AUX, USB-C or digital USB, USB-C connectors can be used as connecting interfaces 540 and 556 between the smartphone 504 and the modulation-demodulation device 566. The ability to automatically manage the mobile phone client 508 and the IM/VOIP client 522 installed on the smartphone 504 by the smartphone software is implemented through the Phone and IM/VoIP client management agent 510.

The wired speaker audio output 550 of the smartphone 504 is wired to the audio input 552 of the modulation-demodulation device 566, and the wired microphone audio input 546 of the same smartphone is wired to the audio output 548 of the modulation-demodulation device 566.

The remote subscriber of the telephone network 512 establishes a conversational connection with the telephone client 508 installed on the base smartphone 504 over the network of the mobile operator 506. To answer a call or dial the number of the remote subscriber of the telephone network 512, the telephone client 508 is controlled by the Phone and IM client management agent/VoIP 510.

The remote IM/VoIP service client 518 establishes a conversational connection with the IM/VOIP client 522 installed on the host smartphone 504 over the IM/VOIP service network 530. To answer the call or call the contact of the remote IM/VoIP client 518, the IM/VOIP client The 522 is managed by the Phone and IM/VoIP 510 client management agent.

During a conversation between remote telephone subscriber 512 and remote IM/VoIP client 518, multidirectional audio streams circulate as follows. The outgoing audio stream 520 from the remote IM/VoIP client 518 is delivered to the IM/VOIP client 522 installed on the base smartphone 504. This audio stream is then ultrasonically modulated in action 528 under the control of the Phone and IM/VoIP client management agent 510. The modulated stream from the remote IM/VoIP client 518 is sent via channel 524 to the smartphone operating system mixer 526.

The outgoing audio stream 514 from the remote subscriber of the telephone network 512 is supplied to the mixer of the smartphone operating system 526. Next, on the mixer of the smartphone operating system 526, the modulated audio stream 524 from the remote IM/VoIP client 518 is summed with the real audio stream 514 from the remote subscriber of the telephone network 512. The resulting audio stream 538, containing audio from a remote subscriber of the telephone network 512 and modulated audio from a remote client of the IM/VoIP service 518, is sent to the output of the wired channel 550 of the wired audio interface of the smartphone 540 and then to the input 552 of the modulation-demodulation device 566 and so on, to a high-pass filter 558. The filter 558 extracts two streams from the resulting stream: the ultrasound-modulated stream 562 from the remote IM/VoIP client 518, and the actual audio stream 564 from the remote telephone network subscriber 512. The actual stream 564 is then ultrasound-modulated in action 529 and this already modulated stream 574 is fed to the adder 560. Accordingly, the ultrasonic modulated stream 562 is demodulated in action 570 into the real stream 572 and supplied to the adder 560.

Next, at the adder 560 of the modulation-demodulation device 566, the modulated audio stream 574 from the remote subscriber 512 of the telephone network 506 is summed with the real audio stream 572 from the remote IM/VoIP client 518 of the service network 530.

The resulting audio stream 536, containing modulated audio from the remote subscriber of the telephone network 512 and real audio from the remote IM/VoIP client 518, is supplied from the output 548 of the modulation-demodulation device 566 to the input 546 of the wired audio interface of the smartphone 540 and then to the high-frequency filter frequency 544, implemented as an additional function of the Phone and IM/VoIP client management agent 510. Filter 544 extracts two streams from the resulting stream 536: an ultrasonic modulated stream 534 from a remote telephone network subscriber 512, and a real audio stream 516 from a remote IM/VoIP client 518. The actual audio stream 516 through the telephone client 508 is supplied over the mobile telephone network 506 towards the remote subscriber 512.

Next, stream 534, modulated by ultrasound from the remote subscriber of the telephone network 512, is demodulated in action 542 into the actual stream 532 and fed through the IM/VoIP client 522 and the service network 530 towards the remote IM/VoIP client 518. As a result, between the remote subscriber 512 of the mobile telephone network 506 and the IM/VoIP client 518 of the service network 530 establish a full duplex conversational connection. Instead of smartphone 504, you can use any type of computer (502). For example, PC, laptop, tablet, etc.

Figure 6:
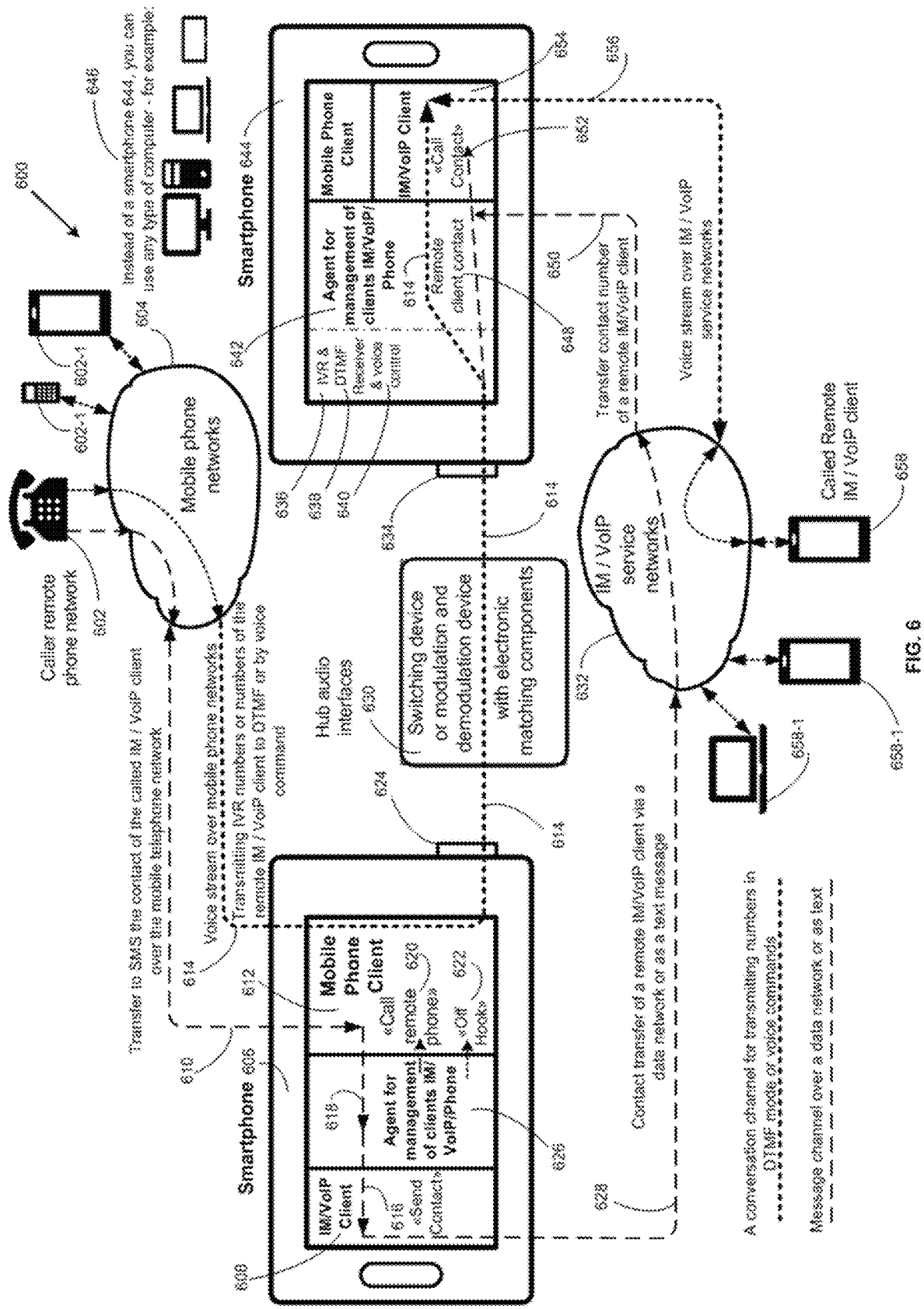
FIG. 6 Illustrates exemplary options for implementing conversational connections and PBX routing for the case of an incoming call from remote subscribers of the telephone network to remote clients of the IM/VoIP service.
Figure 7:
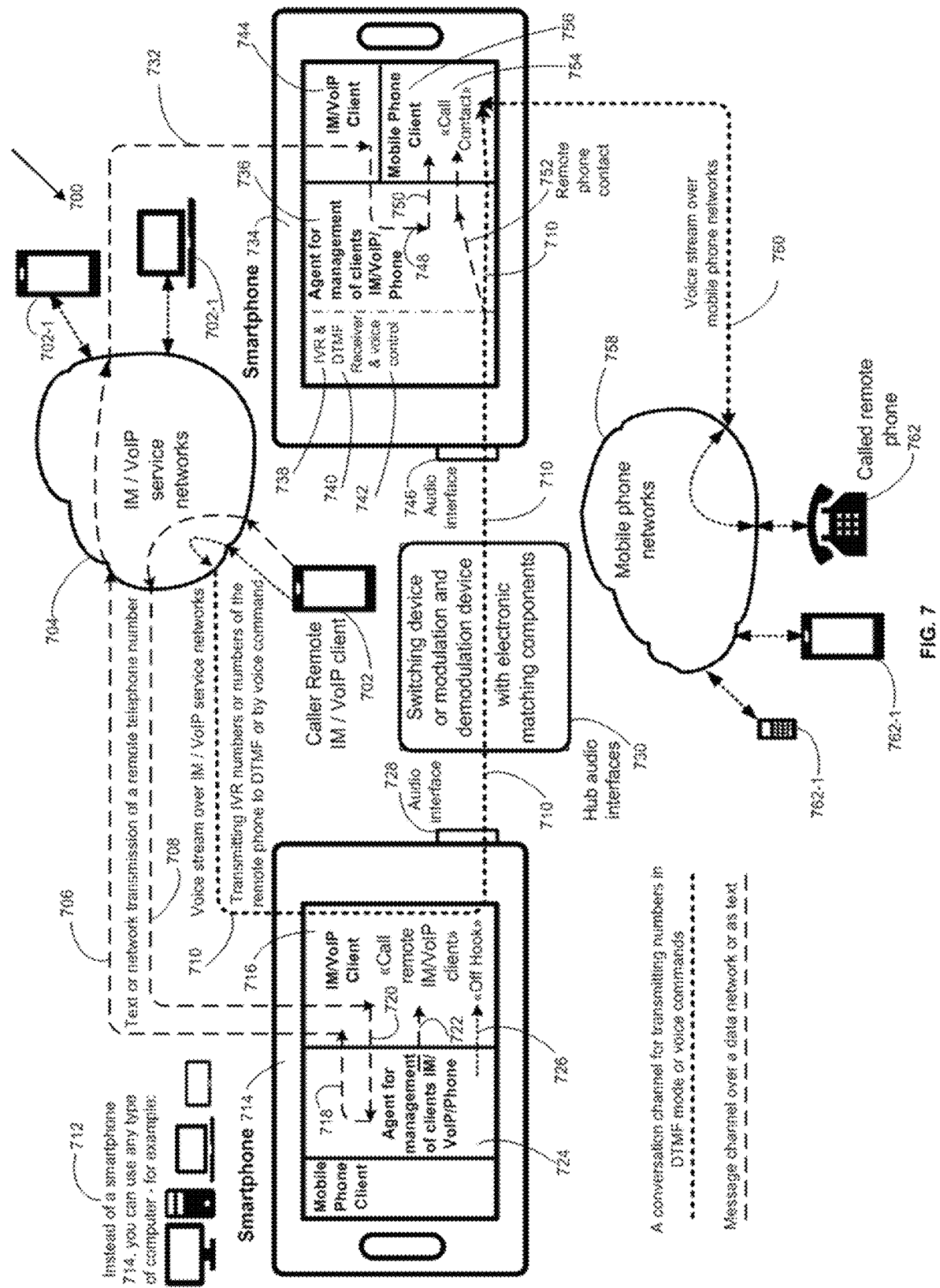
FIG. 7 Illustrates exemplary options for implementing conversational connections and PBX routing for the case of an incoming call to remote telephone network subscribers from remote IM/VoIP service clients.

FIG. 6 and FIG. 7 illustrate an exemplary embodiment of a method for implementing a PBX (mini-PBX) that connects mobile network subscribers and IM/VoIP service clients without using remote services, taking into account that remote clients of the IM/VoIP service can be considered internal PBX subscribers.

This option includes the technical result of a method for duplex transmission of voice streams between a mobile application client of a smartphone mobile phone and a mobile application client IM/VOIP of a smartphone using the audio interface of a smartphone in the aspects and exemplary embodiments described above, as well as the use of automatic control of the mobile client phone and the IM/VOIP client of the smartphone using smartphone software for routing and switching connections between remote subscribers of the telephone network and remote IM/VOIP clients.

The required smartphone software is implemented as a Phone and IM/VoIP client management agent.

FIG. 6 illustrates in detail exemplary options for conversational connections and PBX routing for the case of an incoming call to PBX subscribers, that is, to called remote clients of the IM/VoIP service 658 and 658-1 from remote subscribers of the telephone network 602 and 602-1.

It is clear that the claimed method includes other implementations of the algorithm for establishing a conversational connection for a given case. FIG. 6 and FIG. 7 illustrate one of the possible examples of implementation of the corresponding method for the most complete understanding of the essence of the invention, the scope of which is determined by the claims.

For the case of outgoing calls to PBX subscribers, that is, from calling remote IM/VoIP clients 702 and 702-1 to remote telephone network subscribers 762 and 762-1, details are given in FIG. 7 and will be discussed after the example of FIG. 6.

Preliminarily according to FIG. 6 audio inputs and audio outputs of audio interfaces 624 and 634 of smartphones 606 and 644 are connected to each other wired or wirelessly through an audio interface hub 630. Instead of a smartphone 644, any type of computer (646) can be used.

Similar to FIG. 7 audio inputs and audio outputs of audio interfaces 728 and 746 of smartphones 714 and 734 are connected to each other wired or wirelessly through an audio interface hub 730. Instead of a smartphone 714, any type of computer (712) can be used.

It is assumed that the audio interface hub is 630 or 730, respectively, according to FIG. 6 and FIG. 7 can be implemented for a different number of underlying smartphones in the PBX (one, two or more than two) using different types of wired and wireless audio interfaces. More detailed descriptions of implementations for various types of hubs of audio interfaces 630 or 730 in the form of corresponding devices are contained above in the descriptions of the method for duplex transmission of voice streams between mobile phone clients and IM/VOIP clients installed on smartphones, and in the figures with the corresponding reference number: FIGS. 1 and 122, FIGS. 2 and 224, FIGS. 3 and 322, FIGS. 4 and 420, FIGS. 5 and 566. Thus, the hub of audio interfaces is 630 or 730, respectively, according to FIG. 6 and FIG. 7 can be implemented as a device in any of the above ways, but for simplicity and clarity of the stated implementation principles, the PBX is designated by a single functional block 630 or 730 in FIG. 6 and FIG. 7 respectively. That is, the proposed PBX implementation example is valid for the application of various types of audio interface hub devices 630 or 730 according to FIG. 6 and FIG. 7 respectively.

To route the connection, the Phone and IM/VoIP client management agent 642 of the smartphone 644 may pass the contact information of the called remote IM/VoIP client 658 from the calling remote subscriber to the telephone network 602.

The contact of the called remote IM/VoIP client 658 can be transmitted either as text messages or messages over the data network, or over the talk channel 614. The connection establishment process and possible routing options over the talk channel are described below in detail.

A remote subscriber to the telephone network 602 calls the mobile telephone client 612 of the base smartphone 606 over the mobile operator network 604. A conversational connection is established after a call from the remote subscriber to the telephone network 602 is answered by the mobile telephone client 612 at the command of the Telephone and IM/VoIP client management agent 626 in action 622. Accordingly, a transparent circulation of a duplex voice stream occurs over channel 614 from a remote subscriber of the telephone network 602 through the mobile telephone network 604, the mobile telephone client 612 of the smartphone 606, then through the audio interface 624 of the smartphone 606, the hub of audio interfaces 630, the audio interface 634 of the smartphone 644 to Phone and IM/VoIP 642 Smartphone 644 Client Management Agent and vice versa.

The contact number or contact of the called remote IM/VoIP client 658 from the caller 602 can be transmitted over the talk channel in the following ways:

The Phone and IM/VoIP client management agent 642 of the smartphone 644 includes the IVR 636. The calling remote subscriber of the telephone network 602, based on the IVR proposals, selects the called remote IM/VoIP client by dialing the appropriate numbers in DTMF mode.

The Phone and IM/VoIP Client Management Agent 642 of the smartphone 644 contains a DTMF receiver 638. The calling remote subscriber of the telephone network 602 in DTMF mode dials the corresponding contact digits of the called remote client IM/VoIP 658.

The Phone and IM/VoIP Client Management Agent 642 of the smartphone 644 contains a voice command receiver 640. The calling remote subscriber of the telephone network 602 speaks the contact name of the called remote IM/VoIP client 658.

The Phone and IM/VoIP client management agent 642 of the smartphone 644 in the case of static routing uses the pre-recorded contact of the called remote IM/VoIP client 658.

The contact number or contact of the called remote IM/VoIP client 658 can be obtained by any of the above methods. After the contact of the called remote IM/VoIP client 658 in action 648 is received by the Phone and IM/VoIP client management agent 642 of smartphone 644, the call in action 652 is routed through the IM/VoIP client 654 installed on the base smartphone 644 to the remote IM/VoIP client 658, which can be one of the PBX internal subscribers. As a result, a full duplex conversational connection is established between the remote telephone subscriber 602 and the remote IM/VoIP client 658 over channels 614 and 656.

The contact number or contact of the called remote client IM/VoIP 658 from the caller 602 can also be transmitted via message channel 610 on the mobile phone network 604 and further on channels 628 and 650 via the IM/VoIP service network 632 in text message format or messages over a data network. In this case, the conversational connection between the remote caller of the telephone network 602 and the remote IM/VoIP client 658 can be carried out as follows.

The mobile telephone client 612 of the base smartphone 606 receives an SMS with the contact of the remote IM/VoIP client 658 via channel 610. This information is then received by the Phone and IM/VoIP client management agent 626 of the smartphone 606 via channel 618. Then the client of the IM/VoIP service 608 basic smartphone 606, upon command 616 of the management agent 626, then transmits the contact via channel 628 and 650 through the network of the IM/VoIP service 632 in the form of text or data to the client management agent of the Phone and IM/VoIP 642 of the smartphone 644.

The call inaction 652 is then routed by the management agent 642 through the IM/VoIP client 654 installed on the base smartphone 644 to the remote IM/VoIP client 658, which may be one of the internal subscribers of the PBX.

At the same time, the call in action 620 is routed by management agent 626 through the mobile telephone client 612 installed on the host smartphone 606 to the remote caller of the telephone network 602. After responses from the remote parties 602 and 658, a full duplex conversational connection is established on channels 614 and 656. Instead of a smartphone 644, you can use any type of computer (646). For example, PC, laptop, tablet, etc.

FIG. 7 illustrates in detail an example of the implementation of options for conversational connections and PBX routing for the case of calls originating from PBX subscribers, that is, from calling remote IM/VoIP clients 702 and 702-1 to called remote subscribers of the telephone network 762 and 762-1.

To route the connection, the Phone and IM/VoIP client management agent 736 of the smartphone 734 may transmit the called remote subscriber contact information of the telephone network 762 from the calling remote IM/VoIP client 702. The called remote subscriber contact of the telephone network 762 can be transmitted either as text messages or messages over the data network and over the talk channel 710. The connection establishment process and possible routing options over the talk channel are described in detail below.

The remote IM/VoIP client 702 calls the IM/VoIP client 716 installed on the base smartphone 714 over the network of the IM/VoIP service 704. The conversational connection is established after a call from the remote IM/VoIP client 702 is answered by the IM/VoIP client 716 of the base smartphone 714 at the command of the Phone and IM/VoIP client management agent 724 in action 726.

Accordingly, a transparent circulation of the duplex voice stream occurs over channel 710 from the remote IM/VoIP client 702 through the IM/VoIP service network 704, the IM/VoIP client 716 of the base smartphone 714, then through the audio interface 728 of the smartphone 714, the audio interface hub 730, audio interface 746 of the smartphone 734 to the Phone and IM/VoIP client management agent 736 of the smartphone 734 and vice versa.

The contact of the called remote subscriber of the telephone network 762 from the calling remote IM/VoIP client 702 can be transmitted over the talk channel in the following ways:

The Phone and IM/VoIP client management agent 736 of the smartphone 734 includes the IVR 738. The calling remote IM/VoIP client 702, based on the IVR suggestions, selects the called remote subscriber of the telephone network 762 by dialing the appropriate digits in DTMF mode.

The Phone and IM/VoIP client management agent 736 of the smartphone 734 contains a DTMF receiver 740. The calling remote IM/VoIP client 702 dials in DTMF mode the corresponding digits of the number of the called remote subscriber of the telephone network 762.

The Phone and IM/VoIP client management agent 736 of the smartphone 734 contains a voice command receiver 742. The calling remote client of the IM/VoIP service 702 pronounces in voice the name of the contact of the called remote subscriber of the telephone network 762.

The Phone and IM/VoIP Client Management Agent 736 of the smartphone 734 in the case of static routing uses the pre-recorded number of the called remote subscriber of the telephone network 762.

The contact or number of the called remote subscriber of the telephone network 762 can be obtained by any of the above methods using the corresponding functionality 738, 740 and 742. After receiving the contact of the called remote subscriber of the telephone network 762 in action 752 on the talk channel 710 by the Phone client management agent and IM/VoIP 736 of smartphone 734, the call in action 754 is routed through the mobile telephone client 756 installed on the base smartphone 734, through the mobile network 758 to the remote subscriber of the telephone network 762. After responses from the remote parties 702 and 762, a full duplex conversational connection is carried out over channels 710 and 760.

The contact number or contact of the called remote subscriber of the telephone network 762 from the remote IM/VoIP client 702 can also be transmitted via message channels 708, 706 and 732 over the network of the IM/VoIP service 704 in the form of text messages or messages over the data network.

In this case, the conversational connection between the calling remote IM/VoIP client 702 and the called remote subscriber of the telephone network 762 can be carried out as follows.

The IM/VoIP client 716 of the base smartphone 714 receives a text message or a message over the data network with a contact of a remote subscriber of the telephone network 762 via channel 708. This information is then received by the client management agent of the Phone and IM/VoIP 724 of the smartphone 714 via channel 720. Then the IM/VoIP client 716 of the base smartphone 714, at the command 718 of the management agent 724, transmits the contact of the remote subscriber of the telephone network 762 in text or data format via channels 706 and 732 through the IM/VoIP service network 704 to the IM/VoIP client 744 of the base smartphone 734 and so on via channel 748 to the Phone and IM/VoIP client management agent 736 of the smartphone 734.

The call in action 750 is then routed by the Phone and IM/VoIP client management agent 736 through the mobile client 756 installed on the base smartphone 734 to the remote callee of the telephone network 762 via the mobile telephone network 758.

At the same time, the call in action 722 is routed by the management agent 724 through the IM/VoIP client 716 installed on the base smartphone 714 to the remote calling IM/VoIP client 702 over the IM/VoIP service network 704. After responses from the remote parties 702 and 762 provides a full duplex conversational connection via channels 710 and 760.

Additionally, using the PBX-configured audio inputs and audio outputs of the 624 and 634 or 728 and 746 smartphone audio interfaces 606 and 644 or 714 and 734 in FIG. 6 or according to FIG. 7, accordingly, it is possible to use "manual" routing, carried out directly by the user of the base smartphone without using the functionality of the Phone and IM/VoIP client management agent 724, 736, 626 and 642 of the corresponding base smartphones.

The user of basic smartphones independently establishes a conversational connection with the calling or called remote subscriber of the telephone network 602 or 762 with the calling or called remote IM/VOIP client 702 or 658 by answering an incoming call or making an outgoing call using the screen interface of mobile telephone clients 612 or 756 and IM/VOIP clients 716 or 654 corresponding basic smartphones. A conversational connection between a remote telephone network subscriber 602 or 762 and a remote IM/VoIP client 658 or 702, respectively, is established via channels 614 and 656 or 710 and 760, respectively, after the called remote communication clients answer.

Figure 8:
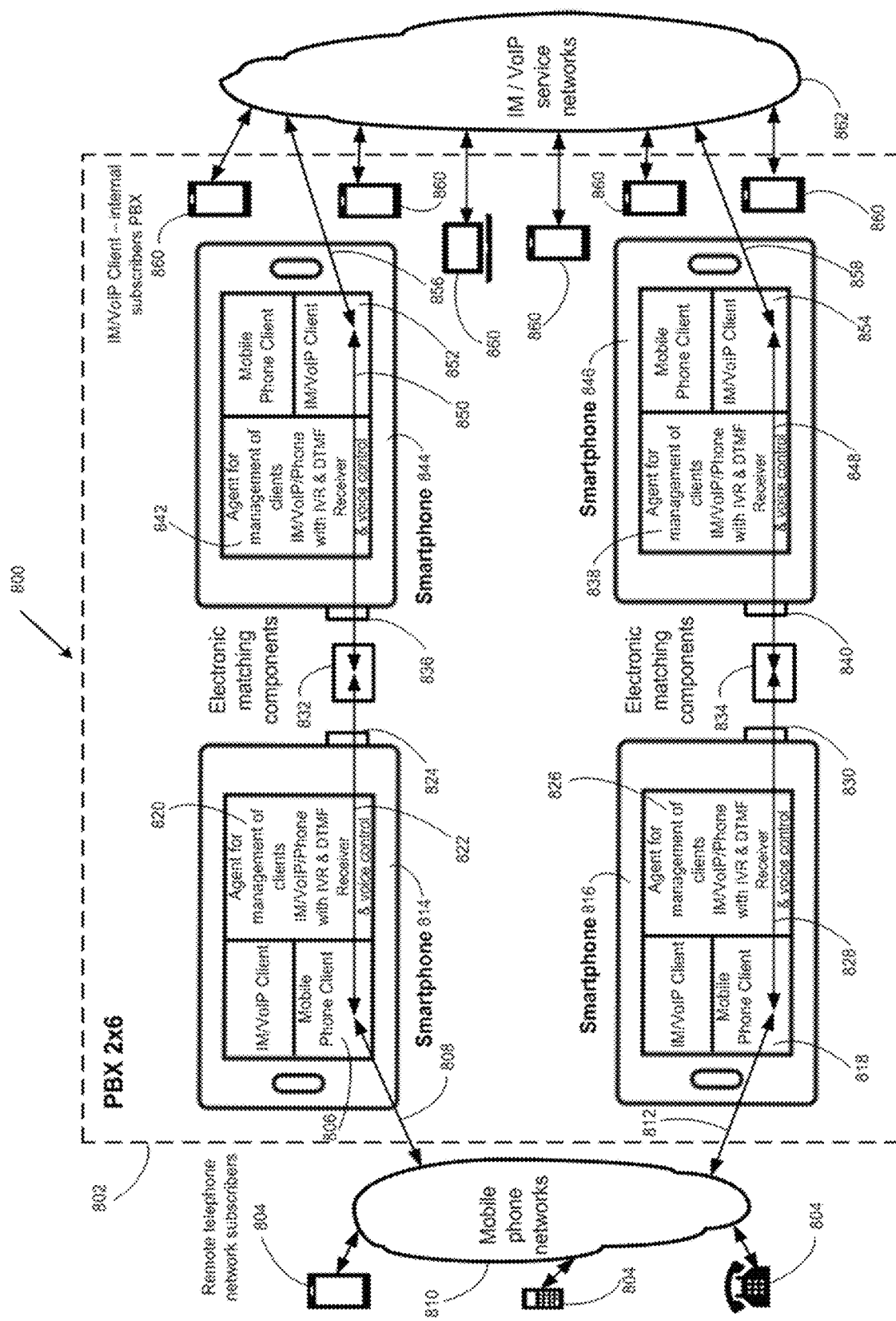
FIG. 8 Illustrates a specific example of a PBX implementation that uses two mobile telephone clients installed on two different smartphones as external lines and six remote IM/VoIP clients as internal subscribers (PBX 2×6).

FIG. 8 illustrates an example of a PBX implementation that can generally be used in practice. This example is presented only for a complete understanding of the operation, demonstration of the simplicity and effectiveness of the application of the claimed invention.

Connection establishment processes and routing methods that can be applied in the PBX implementation illustrated in FIG. 8 are detailed above in the comments to FIG. 6 and FIG. 7 and accordingly are not included in the description of FIG. 8.

Thus, FIG. 8 illustrates an exemplary embodiment of a specific implementation of PBX 802 consisting of two trunks 808, 812 and six extensions 860 (PBX 2×6). The PBX 802 connects six remote IM/VoIP clients 860, which are internal subscribers of the PBX 802, to "external" telephone networks through two IM/VoIP clients 852 and 854 base smartphones 844 and 846, respectively, and two mobile phone clients 806 and 818 base smartphones 814 and 816 respectively.

The PBX 802 hardware contains four base smartphones connected in pairs via an electrically matched wired analog audio output connection of one smartphone to the analog audio input of another smartphone of analog audio interfaces of smartphones. AUX or USB-C connectors can be used as analog audio interfaces for smartphones.

Accordingly, preliminary according to FIG. 8 analog wired audio inputs and audio outputs of audio interfaces 824 and 836 of smartphones 814 and 844 are respectively connected to each other through electronic matching components 832, and analog wired audio inputs and audio outputs of audio interfaces 830 and 840 of smartphones 816 and 846 are respectively connected to each other via electronic 834 matching components.

Once an incoming or outgoing conversational connection has been established on channel 808 using any of the routing methods outlined in the comments to FIG. 6 and FIG. 7, there is a transparent circulation of a duplex voice stream from any remote subscriber 804 of the telephone mobile network 810 via channel 808 to the mobile telephone client 806 of the smartphone 814 and via channel 822 to the Phone and IM/VoIP client management agent 820 of the smartphone 814, then through the audio interface 824 of the smartphone 814 and electronic matching components 832 via channel 850 to the audio interface 836 of the smartphone 844 to the Telephone and IM/VoIP client management agent 842 of the 844 smartphone and the IM/VoIP client 852 of the 844 smartphone, then via channel 856 through the IM/VoIP service network 862 to any client IM/VoIP 860, which is an internal subscriber 860 PBX 802, and vice versa.

After establishing an incoming or outgoing other conversational connection on channel 812 using any of the routing methods outlined in the comments to FIG. 6 and FIG. 7, there is a transparent circulation of a duplex voice stream from any remote subscriber 804 of the telephone mobile network 810 via channel 812 to the mobile telephone client 818 of the smartphone 816 and via channel 828 to the Phone and IM/VoIP client management agent 826 of the smartphone 816, then through the audio interface 830 of the smartphone 816 and electronic matching components 834 via channel 848 to the audio interface 840 of the smartphone 846 to the Phone and IM/VoIP client management agent 838 of the smartphone 846 and the IM/VoIP client 854 of the smartphone 846, then via channel 858 through the IM/VoIP service network 862 to any client IM/VoIP 860, which is an internal subscriber 860 PBX 802, and vice versa.

Any type of computer can be used in place of the 860 computers. For example, PC, laptop, tablet, etc.

Actually shown in FIG. 8 PBX can be quickly installed and used by a simple incompetent user using outdated smartphones that have been taken out of service.

Figure 9:
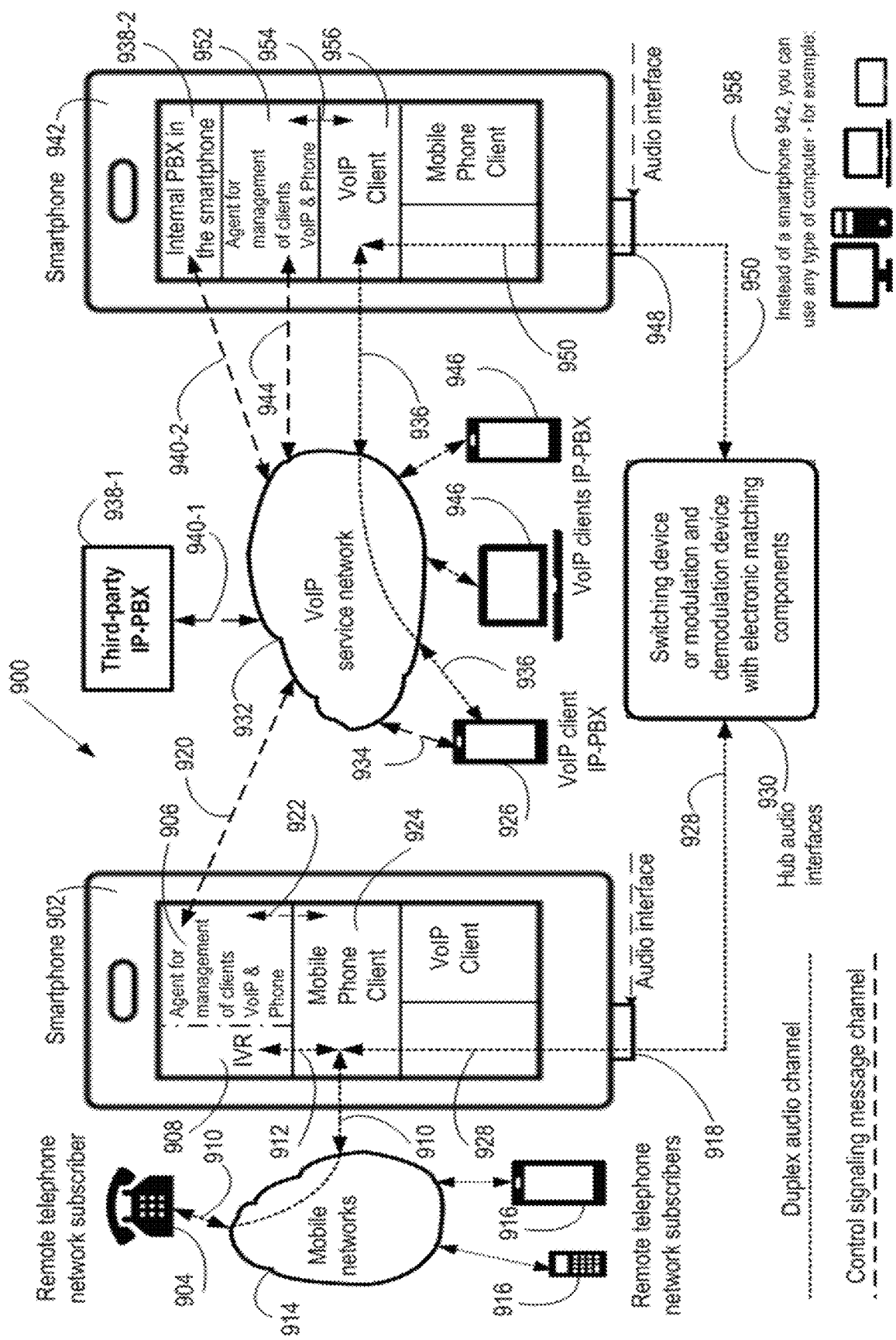
FIG. 9 Illustrates an exemplary embodiment of a method for implementing a VoIP-Cell gateway for broadcasting voice traffic between a mobile phone client application and an IM/VOIP client application controlled by IP-PBX, both as part of a third-party IP-PBX, and under the control of an IP-PBX installed directly on hardware and software platform of the basic smartphone.

FIG. 9 illustrates an exemplary embodiment of a method for implementing a VoIP-Cell gateway for broadcasting voice traffic between a mobile phone client and a VoIP client installed on smartphones under IP-PBX control using the audio interfaces of smartphones.

It is clear that the claimed method includes other implementations of interactions between communication clients of basic smartphones under the control of the Phone and VoIP client management agent for use as part of a VoIP-Cell gateway and IP-PBX. FIG. 9 simply illustrates one possible example implementation.

The VoIP-Cell gateway can be used not only as part of a third-party IP-PBX 938-1, but also under the control of an IP-PBX 938-2 installed directly on the hardware and software platform of the base smartphone 942.

The presented option is based on the application of the technical result of the method for duplex transmission of voice streams between mobile phone clients and VOIP clients installed on smartphones, using the audio interface of the smartphone, in the aspects and exemplary embodiments described above, as well as automatic control of the mobile phone client and a VOIP client using smartphone software to broadcast voice traffic between a mobile phone client and a VOIP client installed on smartphones, under IP-PBX control using smartphone audio interfaces.

As a result of the implementation of the claimed invention, it becomes possible to use appropriately configured smartphones as a VoIP-Cell gateway as part of an IP-PBX. Accordingly, switching and routing of connections between remote subscribers of the telephone network and subscribers of available IP-PBX networks using the mobile phone client application of the base smartphone and the VoIP client application of the base smartphone is carried out under the control of a third-party 938-1 or "internal" IP-PBX 938-2 installed directly on the base smartphone 942. Both the third-party 938-1 and the "internal" 938-2 IP-PBX and the corresponding control channels 940-1 and 940-2 perform absolutely identical control, switching and connection routing actions. Thus, for a better understanding of the comments to FIG. 9 IP-PBX corresponding control channels for both applications will be designated by the same reference number 938 and 940 respectively.

The required smartphone software is implemented in the form of Phone and IM/VoIP client management agents 906 and 952 installed on base smartphones 902 and 942, respectively.

That is, smartphones 902 and 942 with audio interfaces 918 and 948 contain software in the form of a management agent 906 and 952 of a client mobile application 924 and a VoIP service application 956, respectively. In turn, these agents 906 and 952 are controlled by IP-PBX 938.

Preliminarily according to FIG. 9 audio inputs and audio outputs of audio interfaces 918 and 948 of smartphones 902 and 942 are connected to each other wired or wirelessly through an audio interface hub 930. Instead of a smartphone 942, any type of computer (958) can be used.

It is assumed that the audio interface hub 930 of FIG. 9 can be implemented for a different number of basic smartphones involved as part of a VoIP-Cell gateway (one or two) using various types of wired and wireless audio interfaces. More detailed descriptions of implementations for various types of hubs of audio interfaces 930 in the format of the corresponding devices are contained above in the descriptions of the method of duplex transmission of voice streams between mobile phone clients and VOIP clients installed on smartphones, in the figures with the corresponding reference numbers FIGS. 1 and 122, FIGS. 2 and 224, FIGS. 3 and 322, FIGS. 4 and 420, FIGS. 5 and 566. Thus, the audio interface hub 930 according to FIG. 9 can be implemented as a device in any of the listed ways, but for simplicity and clarity of the stated principles of implementation of the VoIP-Cell gateway, it is designated by a single functional block 930 in FIG. 9. That is, the proposed implementation example of a VoIP-Cell gateway is valid for the use of various types of audio interface hub devices 930 according to FIG. 9.

The material presented below contains an example of one of many simplified options for the operation of a VoIP-Cell gateway controlled by IP-PBX 938 in the case when the caller is a remote subscriber of the telephone network 904, and the called client is a VoIP client IP-PBX 926.

A caller 904 of the telephone network 914 dials the telephone number of the mobile telephone client 924 of the base smartphone 902. The Phone and IM/VoIP client management agent 906 of the base smartphone 902 receives information from the mobile phone client 924 on channel 922 about the incoming call event. Management agent 906 broadcasts information about this event via channels 920 and 940 to IP-PBX 938, which, after analyzing the received information, transmits a command to answer the call via channels 940 and 920 to management agent 906 in the reverse order. Management agent 906 transmits a call answering command on channel 922 to mobile phone client 924. Upon answering the incoming call, a conversation state is established between caller 904 of telephone network 914 and mobile phone client 924.

Accordingly, there is a transparent circulation of a duplex voice stream from a remote subscriber of the telephone network 904 through the mobile telephone network 914 to the mobile telephone client 924 of the smartphone 902 via channel 910, and then via channel 912 to the IVR 908 controlled by the management agent 906 and vice versa, via the channel 928 through the audio interface 918 of the smartphone 902 to the audio interface hub 930, to the audio interface 948 of the smartphone 942 via channel 950 and back.

The remote subscriber of the telephone network 904, based on the voice offers of the IVR 908, selects the called VoIP client 926 IP-PBX 938 by dialing the offered digits in DTMF mode. Management agent 906 receives dialed digits via channel 912 and transmits them for routing to IP-PBX 938 via channels 920 and 940 over the VoIP service network 932. IP-PBX 938 analyzes the received information and transmits the contact of the called VoIP client 926 to IP-PBX 938 via the network VoIP service 932 via channels 940 and 944 to the management agent 952 of the base smartphone 942. Next, the VoIP client 956, installed on the smartphone 942, receives the contact of the called VoIP client 926 IP-PBX 938 via channel 954 from the management agent 952 and, under its control, makes a call to the VoIP client 926 IP-PBX 938. After answering this call, a duplex conversational connection is established between the remote caller of the telephone network 904 and the called VoIP client 926 IP-PBX 938 via channels 910, 928, 950 and 936 through the audio interface hub 930.

In this case, the called client can be any client or subscriber of the operator networks of available IP-PBX 938. For example, any subscribers of remote telephone networks 916 and any remote VoIP clients 946 IP-PBX 938.

The following material below contains an example of one of many simplified options for the operation of a VoIP-Cell gateway controlled by IP-PBX 938 in the case when the calling client is the VoIP client IP-PBX 926, and the called subscriber is a remote subscriber of the telephone network 904.

The calling VoIP client 926 IP-PBX 938 dials the telephone number of the remote subscriber 904 of the telephone network 914 and transmits information about the dialed number on channels 934 and 940 through the VoIP service network 932 for the IP-PBX 938, which parses the received number and performs routing.

Next, the IP-PBX 938 connects the VoIP client 926 and the VoIP client 956 installed on the base smartphone 942 by issuing a connection command through the management agent 952 on channels 940, 944 and 954. Accordingly, a transparent circulation of the duplex voice stream from the VoIP client 926 occurs IP-PBX 938 through the VoIP service network 932, VoIP client 956 installed on the base smartphone 942, then through the audio interface 948 of the base smartphone 942, audio interface hub 930, to the audio interface 918 of the base smartphone 902 and back via channels 936, 950 and 928, 910.

Then IP-PBX 938 gives a command to call the remote subscriber of the telephone network 904 with his number to the management agent 906 via channels 940 and 920. Next, the management agent 906 via channel 922 transmits a call command with the number of the called remote subscriber of the telephone network 904 to the mobile client 924, installed on the base smartphone 902, which calls the remote subscriber of the telephone network 904 using the received number.

After answering this call, a duplex conversational connection is established between the called subscriber 904 of the telephone network 914 and the calling VoIP client 926 IP-PBX 938 on channels 910, 928, 950 and 936 through the audio interface hub 930.

In this case, the called client can be any client or subscriber of the operator networks of available IP-PBX 938. For example, any subscribers of remote telephone networks 916 and any remote VoIP clients 946 IP-PBX 938.

The examples given above illustrate two approximate options for the operation of a VoIP-Cell gateway under IP-PBX control to implement a conversational connection between a remote telephone network subscriber and an IP-PBX client. It is clear that based on the proposed method, it is possible to give other examples of connecting any clients and subscribers of accessible IP-PBX networks using a VoIP-Cell gateway. Examples according to FIG. 9 are provided to illustrate exemplary use in practice of the relevant portion of the claims.

Likewise, given the disclosure of the inventions in the description, those skilled in the art can obtain and practice other features of the inventions that are covered by the following claims. Therefore, the present invention is limited only by the following claims and their equivalents, but is not limited by the foregoing description.

The invention claimed is:

1. A method of duplex transmission of voice streams between a mobile phone client application and an Instant Messaging Voice Over Internet Protocol (IM/VOIP) client application using an audio interface of a smartphone, the method comprising:
   duplex transmission of voice streams between the mobile phone client application and the IM/VOIP client application using a connection between an audio output and an audio input of an audio interface of the smartphone; and
   managing the mobile phone client application and the IM/VOIP client application using software of the smartphone without direct tactile communication with a user.

2. The method according to claim 1, further comprising duplex transmission of the voice streams over an electrically matched wired connection of an audio output of an audio interface of one smartphone with an audio input of an audio interface of another smartphone.

3. The method according to claim 2, further comprising duplex transmission over a hardwired analog connection of an analog audio output of an analog audio interface of the one smartphone with an analog audio input of an analog audio interface of the other smartphone.

4. The method according to claim 2, further comprising duplex transmission over a hardwired digital connection of a digital audio output of a digital audio interface of the one smartphone with a digital audio input of a digital audio interface of the other smartphone.

5. The method according to claim 2, further comprising duplex transmission over a hardwired analog connection of an analog audio output and an audio input of one smartphone with an analog audio input and an audio output of a sound card connected to a digital wire audio interface of the other smartphone.

6. The method according to claim 1, further comprising an interaction between the mobile phone client application or the IM/VOIP client application and a corresponding software agent installed on the smartphone, wherein the software agent is configured to manage functions similar to user commands of the mobile phone client application and the IM/VOIP client application for making a call, answering the call or ending the call automatically without direct tactile communication with the user.

7. The method according to claim 6, further comprising using, by the software agent, accessibility options of operating systems of smartphones to control the mobile phone client application and the IM/VOIP client application via a graphical interface of the smartphone.

8. The method according to claim 1, further comprising duplex transmission of the voice streams with a subsequent connection of the audio outputs with audio inputs on a switching device, thereby enabling a simultaneous connection to more than to one smartphone.

9. The method according to claim 8, further comprising duplex transmission of the voice streams on a wireless connection with a subsequent connection of the audio outputs with the audio inputs on the switching device.

10. The method according to claim 8, further comprising duplex transmission of the voice streams over an electrically matched wired connection with a subsequent connection of the audio outputs with the audio inputs on the switching device.

11. The method according to claim 8, further comprising switching of the voice, between different and identical interfaces of the switching device connected to different smartphones or other computers of any type, and simultaneously arriving at the switching device on wire analog, digital and Bluetooth interfaces.

12. The method according to claim 8, further comprising automatically controlling communication voice clients installed on the smartphone and corresponding connections of the audio outputs with the audio inputs of different smartphones on the switching device using the software of the smartphone without direct tactile communication with the user.

13. The method according to claim 1, further comprising duplex transmission of the voice streams over an electrically matched wired connection between the mobile phone client application and the IM/VOIP client application installed on one smartphone via a device connecting an audio output with an audio input of an audio interface of the one smartphone with channel separation of the voice streams between the mobile phone client application and the IM/VOIP client application.

14. The method according to claim 13, wherein a separation of the voice streams includes:
   modulation with an ultrasonic carrier frequency of the voice stream from the IM/VoIP client application, and transfer of the modulated voice stream to an audio output of the smartphone,
   demodulation of an incoming audio stream with audio input of the smartphone with subsequent transmission of a resulting voice stream to a remote client of an IM/VoIP service implemented via the software of the smartphone;
   detecting and demodulation of the voice stream modulated by the ultrasonic carrier frequency, coming from the audio output of the smartphone,
   detecting and modulation of an unmodulated real voice stream with an ultrasonic carrier frequency coming from an audio output of the smartphone, and
   addition of the voice stream modulated by the ultrasonic carrier frequency, and a demodulated sound stream with subsequent transfer of the resulting voice stream on the audio input of the smartphone on a device connecting the audio output with the audio input of the audio interface of the smartphone.

15. The method according to claim 1, further comprising duplex transmission of voice streams between the mobile phone client application of the smartphone and an IM/VOIP client application of a computer of any type using an audio interface of the smartphone and an audio interface of the computer of any type.

16. A method of implementation of Private Branch Exchange (PBX) for organizing a conversational connection between the mobile phone client application and the IM/VOIP client application using the audio interface of the smartphone, the method comprising:
- using the method according to claim 1 for duplex transmission of voice streams between the client applications of the mobile phone and the IM/VOIP client application using a connection of the audio outputs with the audio inputs of the audio interface of the smartphone; and
- routing a connection between remote subscribers of a telephone network and remote clients of a IM/VoIP service containing an Interactive Voice Response (IVR) system implemented via the software of the smartphone and included in a conversation channel connecting counter voice streams of the IM/VoIP client application and the mobile phone client application using the audio of interfaces of the smartphone by dialing digits in Dual Tone Multi-Frequency (DTMF) mode by a remote calling party to select a contact of a remote called party.

17. The method according to claim 16, further comprising routing of a connection between the remote subscribers of the telephone network and the remote clients of the IM/VoIP service containing a DTMF tone signal receiver implemented using the software of the smartphone and which is switched on in the conversation channel connecting in a full duplex voice streams between the IM/VOIP client application of the smartphone and the mobile phone client application of the smartphone using the audio interfaces of the smartphone which is carried out based on a dialing, in the DTMF mode, of digits of a number of the remote called party, transmitted by the remote calling party.

18. The method according to claim 16, further comprising routing of a connection between the remote subscribers of a telephone network and the remote clients of the IM/VoIP service which is carried out based on text messages containing a contact information of the remote called party, transferred by the remote calling party.

19. The method according to claim 16, further comprising routing of a connection between the calling remote clients of the IM/VoIP service of network and the called remote subscribers of the telephone network on a basis of messages transferred by the remote calling clients of the IM/VoIP service on a data transmission network and containing contact information of the remote called subscribers of the telephone network.

20. The method according to claim 16, further comprising routing of a connection between the remote subscribers of the telephone network and the remote clients of the IM/VoIP service which is carried out based a voice command arriving from the remote calling party and containing contact information of the remote called party.

21. The method according to claim 16, further comprising static routing when the call is transferable only to a predefined contact of the remote called party.

22. The method according to claim 16, further comprising routing which is carried out directly by the user of the smartphone which by means of the mobile phone client application and the IM/VOIP client application of the smartphone, using a screen interface of the smartphone independently establishes a connection with the remote subscriber of telephone network and the remote client of the IM/VoIP service.

23. A method of implementing a VoIP-Cell gateway for broadcasting voice traffic between the mobile phone client application of the smartphone and a VOIP client application of the smartphone under management of Internet Protocol Private Branch Exchange (IP-PBX) using the audio interface of the smartphone, the method including: using the method according to claim 1 for duplex transmission of the voice streams between the mobile phone client application of the smartphone and the VOIP client application of the smartphone using a connection of audio of exits with the audio inputs of the audio interface of the smartphone;
- managing the mobile phone client application and the VOIP client application of the smartphone via the IP-PBX; and
- switching and routing of a connection between remoted subscribers of a telephone network and subscribers of networks of available IP-PBX via the mobile phone client application of the smartphone and the VoIP client application of the smartphone under the managing by the of IP-PBX.

24. The method according to claim 23, wherein a functionality of the IP-PBX is implemented via the software of the smartphone and is installed directly on the smartphone for the management of the switching and routing between the clients of the networks of available IP-PBX including the remote subscribers of the telephone network.

* * * * *